(12) United States Patent
Yamazaki et al.

(10) Patent No.: US 7,426,008 B2
(45) Date of Patent: Sep. 16, 2008

(54) LIQUID CRYSTAL DISPLAY DEVICE AND METHOD FOR MANUFACTURING THE SAME

(75) Inventors: Shunpei Yamazaki, Tokyo (JP); Toru Takayama, Kanagawa (JP)

(73) Assignee: Semiconductor Energy Laboratory Co., Ltd., Kanagawa-Ken (JP)

( * ) Notice: Subject to any disclaimer, the term of this patent is extended or adjusted under 35 U.S.C. 154(b) by 244 days.

(21) Appl. No.: 10/793,422

(22) Filed: Mar. 5, 2004

(65) Prior Publication Data

US 2004/0233374 A1  Nov. 25, 2004

(30) Foreign Application Priority Data

Mar. 7, 2003  (JP) .............................. 2003-062306

(51) Int. Cl.
  G02F 1/13  (2006.01)
  G02F 1/1333  (2006.01)
(52) U.S. Cl. ...................................... 349/187; 349/138
(58) Field of Classification Search ................. 349/189, 349/190
See application file for complete search history.

(56) References Cited

U.S. PATENT DOCUMENTS

| 3,892,471 A | 7/1975 | Biermann et al. |
| 4,325,610 A | 4/1982 | Inoue |
| 4,409,268 A | 10/1983 | Inoue et al. |
| 4,470,667 A | 9/1984 | Okubo et al. |
| 4,482,213 A | 11/1984 | Piliavin et al. |
| 4,691,995 A | 9/1987 | Yamazaki et al. |
| 4,705,345 A | 11/1987 | Ayliffe et al. |
| 4,773,737 A | 9/1988 | Yokono et al. |
| 5,550,091 A * | 8/1996 | Fukuda et al. ......... 204/192.23 |
| 5,929,961 A | 7/1999 | Nishi et al. |
| 6,055,035 A | 4/2000 | Von Gutfeld et al. |
| 6,226,067 B1 | 5/2001 | Nishiguchi et al. |
| 6,277,529 B1 | 8/2001 | Marumoto et al. |

(Continued)

FOREIGN PATENT DOCUMENTS

JP   47-018298   9/1972

(Continued)

OTHER PUBLICATIONS

U.S. Appl. No. 10/757,459, filed Jan. 15, 2004; Yamazaki et al.; "Liquid Crystal Display Device And Manufacturing Method Thereof"; Specification; Claims and Drawings.

(Continued)

*Primary Examiner*—James A Dudek
(74) *Attorney, Agent, or Firm*—Nixon Peabody LLP; Jeffrey L. Costellia

(57) ABSTRACT

A liquid crystal display device using a plastic substrate becomes required to have high resolution, high opening ratio, high reliability, or the like, with the increasing of a screen size. Besides, high productivity and cost reduction is also required. According to the present invention, a protective film 123 comprising at least one silicon nitride film, which is formed by a ratio frequency sputtering using a silicon target, is provided over an opposing substrate (a flexible substrate); sealant 112 is drawn; a liquid crystal material 114 is dropped over the opposing substrate in vacuo; and the opposing substrate is pasted to a flexible substrate 110 provided with a pixel electrode 111 and a columnar spacer 115.

26 Claims, 13 Drawing Sheets

U.S. PATENT DOCUMENTS

| | | | |
|---|---|---|---|
| 6,320,640 | B2 | 11/2001 | Nishi et al. |
| 6,476,899 | B2 | 11/2002 | Ishida et al. |
| 6,638,781 | B1 | 10/2003 | Hirakata et al. |
| 6,639,647 | B1 | 10/2003 | Inou |
| 6,671,030 | B2 | 12/2003 | Gyoda |
| 6,831,725 | B2 | 12/2004 | Niiya |
| 6,839,123 | B2 | 1/2005 | Nishi et al. |
| 6,851,460 | B2 | 2/2005 | Tamai |
| 6,952,020 | B1 | 10/2005 | Yamazaki et al. |
| 2001/0004281 | A1 | 6/2001 | Sasaki |
| 2001/0052959 | A1 | 12/2001 | Tamatani et al. |
| 2002/0027636 | A1 | 3/2002 | Yamada |
| 2002/0063842 | A1 | 5/2002 | Gyoda |
| 2003/0043338 | A1* | 3/2003 | Liou et al. .......... 349/189 |
| 2003/0090609 | A1 | 5/2003 | Inoue et al. |
| 2004/0145692 | A1 | 7/2004 | Yamazaki et al. |
| 2004/0224435 | A1* | 11/2004 | Shibata et al. ........ 438/99 |
| 2005/0105039 | A1 | 5/2005 | Nishi et al. |

FOREIGN PATENT DOCUMENTS

| | | |
|---|---|---|
| JP | 49-126350 | 12/1974 |
| JP | 50-015495 | 5/1975 |
| JP | 51-065656 | 6/1976 |
| JP | 53-091763 | 8/1978 |
| JP | 57-124827 | 8/1982 |
| JP | 59-057221 | 4/1984 |
| JP | 59-171925 | 9/1984 |
| JP | 59-195222 | 11/1984 |
| JP | 60-021028 | 2/1985 |
| JP | 60-075817 | 4/1985 |
| JP | 60-111221 | 6/1985 |
| JP | 60-126624 | 7/1985 |
| JP | 61-190313 | 8/1986 |
| JP | 62-015520 | 1/1987 |
| JP | 62-251723 | 11/1987 |
| JP | 11-109388 | 4/1999 |
| JP | 2000-284295 | 10/2000 |
| JP | 2000284295 | 10/2000 |
| JP | 2002-214626 | 7/2002 |

OTHER PUBLICATIONS

1984 SID International Symposium, Digest of Technical Papers, vol. XV, "E-1: Active Matrix Addressing", p. 74.

1984 SID International Symposium, Digest of Technical Papers, vol. XV, "E-1: Active Matrix Addressing", pp. 74-75.

1984 International Symposium Digest of Technical Papers; "Active Matrix Addressing" First Ed.; Jun. 1984; pp. 74-75.

* cited by examiner

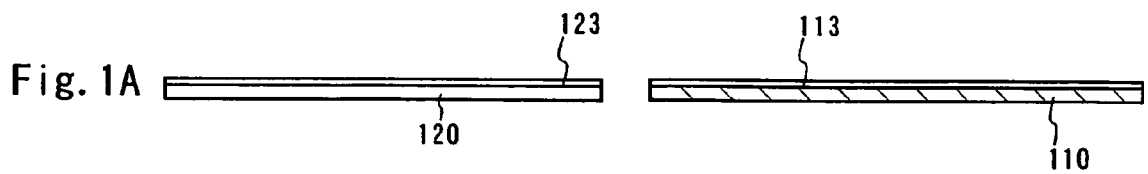
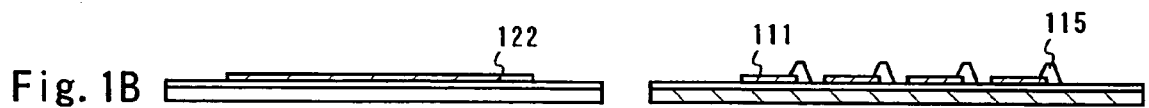
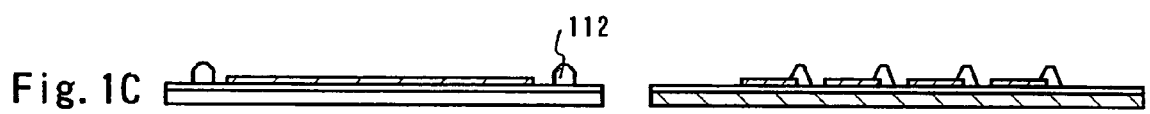
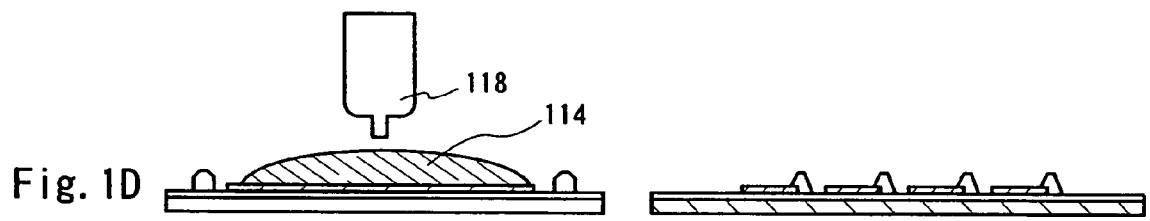
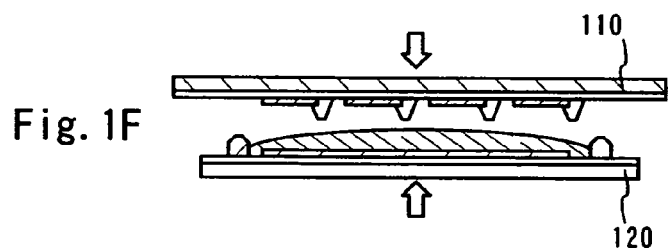
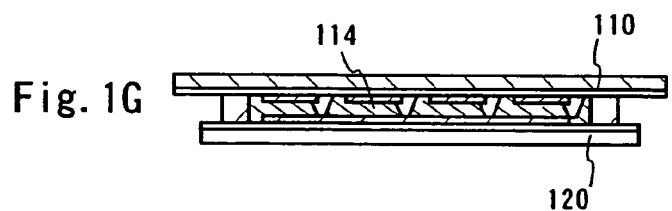

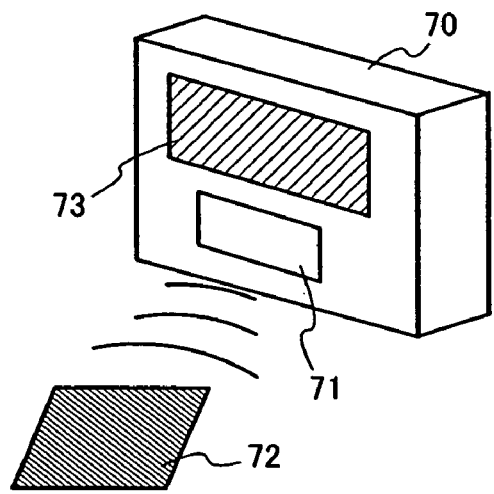
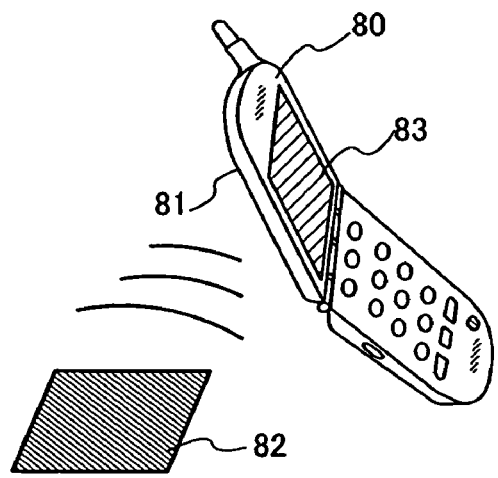
Fig. 11A
Fig. 11B
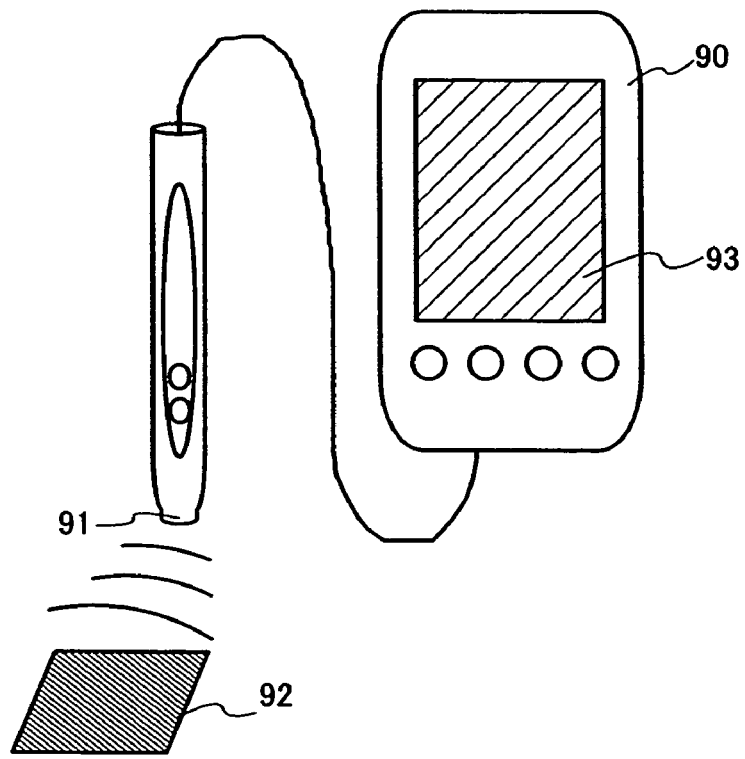
Fig. 11C

LIQUID CRYSTAL DISPLAY DEVICE AND METHOD FOR MANUFACTURING THE SAME

BACKGROUND OF THE INVENTION

1. Field of the Invention

The present invention relates to a liquid crystal display device and a method for manufacturing the liquid crystal display device. More specifically, the invention relates to electronic equipment installed with an electro-optic device, which is typified by a liquid crystal display panel having circuits composed of thin film transistors (hereinafter, TFTs), and such electro-optic devices as components.

2. Related Art

In recent years, a technique for forming a TFT by a semiconductor thin film (having a thickness of approximately from several to several hundreds nm), which is formed over a substrate having an insulating surface. TFTs are applied broadly to electronic devices such as an IC or an electro-optic device, and has been rushed to be developed especially as a switching element of an image display device.

A liquid crystal display device has been known as an image display device. An active matrix liquid crystal display device becomes widely used since the active matrix liquid crystal display device is possible to provide high-resolution images compared with a passive liquid crystal display device. In an active matrix liquid crystal display device, an image pattern is formed on a screen by driving a pixel electrode arranged in a matrix configuration. In specific, a liquid crystal layer, which is interposed between a pixel electrode and an opposing electrode, is optically modulated by applying voltage between the pixel electrode, which is selected, and the opposing electrode, which corresponds to the pixel electrode. The optical modulation is recognized by an observer as a display pattern.

The range of usages of such active matrix electro-optical device becomes widen. The device is required to have high resolution, high opening ratio, and high reliability with the increasing of a screen size. Further, the productivity of the device is required to be improved, and the manufacturing cost is also required to be reduced.

The present applicant discloses drop of liquid crystal in U.S. Pat. No. 4,691,995.

It is an object of the present invention to provide a high reliable liquid crystal display device, which uses liquid crystal materials efficiently and which has flexibility.

Manufacturing cost is increased with the increasing of a panel size. Especially, the liquid crystal material interposed between a pixel electrode and an opposing electrode is expensive.

The invention provides a method for manufacturing a liquid crystal display device using a large substrate in size such as 320×400 mm, 370×470 mm, 550×650 mm, 600×720 mm, 680×880 mm, 1000×1200 mm, 1100×1250 mm, or 1150×1300 mm. Further, the invention provides a method for manufacturing a liquid crystal display device, which is suited to mass-production, using a large substrate in size such as 1500×1800 mm, 1800×2000 mm, 2000×2100 mm, 2200×2600 mm, or 2600×3100 mm.

In order to seal liquid crystal, a complex process such as drawing sealant, pasting an opposing substrate, dividing, injecting a liquid crystal, and sealing a liquid crystal inlet is required. Especially, in case of a large sized panel, it becomes difficult to inject a liquid crystal by a capillary phenomenon and to fill the region (at least including a pixel portion) surrounded by seal with the liquid crystal.

Two substrates are pasted together, and divided, and injected with the liquid crystal from a liquid crystal inlet formed on the divided surface. In this instance, a path extended from the liquid crystal inlet to a pixel region is filled with the liquid crystal. Further, in case of a driver circuit portion and a pixel portion are provided on one substrate, not only the pixel portion region but also the driver circuit region is sometimes filled with the liquid crystal. Except the region for display portion is filled with the liquid crystal.

There is the threat that since extremely larger amounts of liquid crystal passes the path of the liquid crystal extended from the liquid crystal inlet to the pixel region, especially, the vicinity of the liquid crystal inlet, compared with another region of the panel; the surface of an orientation film is deteriorated due to friction caused by injecting the liquid crystal, and a liquid crystal orientation is distorted as a result.

In addition, a liquid crystal display device is expected to be applied to various electronic equipment, especially a portable device. Presently, there are many liquid crystal display devices manufactured by using a glass substrate or a quartz substrate. However, these substrates have disadvantages of being fragile and heavy. Further, the glass substrate or the quartz substrate is unsuited to mass-production since it is difficult to use a large sized glass or quartz substrate for mass-production. Therefore it has been attempted that a substrate having flexibility, typically, a flexible plastic substrate is used for manufacturing a liquid crystal display device.

However, a plastic film has poor blocking properties against impurities such as moisture or alkaline metals, so that a high reliable liquid crystal display device cannot be obtained. Consequently, a liquid crystal display device having high technical advantages, which is manufactured by using a plastic substrate, has not been realized yet.

SUMMARY OF THE INVENTION

In view of the foregoing, the present invention provides a liquid crystal display device manufactured by providing a protective film over an opposing substrate (a first flexible substrate), drawing sealant, dropping a liquid crystal material on the opposing substrate in vacuo (under reduced pressure), and pasting the opposing substrate to a second flexible substrate, which is provided with a pixel electrode and a columnar spacer. The pair of substrates is preferably pasted together under reduced pressure so as to be spaced evenly by means of the columnar spacer.

In addition, the sealant may be drawn by a dispenser device or an ink jet device. Further, the sealant may be drawn under reduced pressure or in inert atmosphere at atmospheric pressure. In case that solvent is added to the sealant for controlling the degree of viscosity, the solvent, which is hardly volatile, is preferably used to prevent the sealant from deteriorating and curing during dropping under reduced pressure.

Further, the sealant is drawn in a closed pattern so as to surround a pixel portion. The space surrounded by the sealant is filled with a liquid crystal material.

Sealant can be drawn and a liquid crystal can be dropped on one substrate provided with a pixel portion. In addition, a protective film can be provided over a flexible substrate, and a liquid crystal material can be dropped on a pixel electrode, that is, only a pixel portion (under reduced pressure), then, the flexible substrate can be pasted to an opposing substrate provided with the sealant.

As the protective film according to the invention, a single layer film of a silicon nitride film formed by ratio frequency sputtering using a silicon target, or a lamination layer film of the silicon nitride film and a silicon oxide film is preferably used.

The dense silicon nitride film formed by ratio frequency sputtering using a silicon target prevents effectively varies of threshold voltage caused by contamination of a TFT (a polysilicon TFT, an amorphous TFT, an organic TFT, or the like) due to alkaline metals or alkaline earth metals such as natrium, lithium, magnesium, or the like, and has extremely high blocking properties against moisture or oxygen. In order to improve the blocking properties, the content of oxygen and hydrogen in the silicon nitride film is preferably at most 10 atomic %, more preferably, at most 1 atomic %.

The specific sputtering condition is as follows: a nitrogen gas or a nitrogen and rare gas mixture are used; pressures of from 0.1 to 1.5 Pa; frequencies of from 13 to 40 MHz; electric powers of from 5 to 20 W/cm$^2$; substrate temperatures of from room temperature to 350° C.; distances between a silicon target (1 to 10 Ωcm) and a substrate of from 40 to 200 mm; and backpressure of at most $1 \times 10^{-3}$ Pa. Rare gas may be sprayed on the back of a substrate. For example, the dense silicon nitride film, which is formed in the condition, that is, flow ratio is set as Ar: $N_2$=20 sccm: 20 sccm; pressure of 0.8 Pa; frequencies of 13.56 MHz; electric powers of 16.5 W/cm$^2$; substrate temperature of 200° C.; distances between a substrate and a silicon target of 60 mm; backpressure of $3 \times 10^{-5}$ Pa; has characteristics of having low etching rate of at most 9 nm (preferably, at most from 0.5 to 3.5 nm), and a low hydrogen concentration of at most $1 \times 10^{21}$ atoms/cm$^{-3}$ (preferably, at most $5 \times 10^{20}$ atoms/cm$^{-3}$). As used herein, the term "etching rate" refers to the speed of etching at 20° C. using LAL500. In addition, the term, as used herein, "LAL500" refers to a product "LAL 500 SA buffered hydrofluoric acid" manufactured by Hashimoto Chemical KK, and is an aqueous solution of $NH_4HF_2$ (7.13%) and $NH_4F$ (15.4%).

A silicon nitride film formed by sputtering has the following characteristics: dielectric constant of from 7.02 to 9.3; refractive index of from 1.91 to 2.13; internal stress of from 4.17 to $10^8$ dyn/cm$^2$; and etching rate of from 0.77 to 1.31 nm/min. The unit of plus sign or minus sign of the internal stress is depending on internal stress of a compressive stress or a tensile stress. Only an absolute value is referred to here. The silicon nitride film formed by sputtering has a Si concentration of 37.3 atomic % and an N concentration of 55.9 atomic %, each of which is obtained from the result of RBS. The silicon nitride film formed by sputtering has a hydrogen concentration of $4 \times 10^{20}$ atoms/cm$^{-3}$, an oxygen concentration of $8 \times 10^{20}$ atoms/cm$^{-3}$, and a carbon concentration of $1 \times 10^{19}$ atoms/cm$^{-3}$. The silicon nitride film formed by sputtering has transmittance of at least 80%. FIG. 5 shows a SIMS measurement result of the silicon nitride film (having a thickness of 130 nm).

FIG. 6 is a SIMS measurement result of a silicon nitride film (having a thickness of 30 nm) and a silicon oxide film (having a thickness of 20 nm). The silicon nitride film has argon at a concentration of from $1 \times 10^{20}$ to $1 \times 10^{21}$ cm$^{-3}$. Table 1 shows a typical example of the condition for forming the silicon nitride film and the silicon oxide film.

TABLE 1

|  | Silicon Oxide (A) | Silicon Oxide (B) | Silicon Nitride |
|---|---|---|---|
| Gas | Ar/$O_2$ | ← | Ar/$N_2$ |
| Flow Ratio | 10/30 | ← | 20/20 |
| Pressure (Pa) | 0.4 | ← | 0.8 |
| Frequency (MHz) | 13.56 | ← | ← |
| Electric Power (W/cm$^2$) | 4.1 | ← | ← |
| Substrate Temperature | 200 | ← | ← |
| Target Material | Si (B-doped 1-10 Ω cm) | Synthetic Quartz | ← |
| T/S (mm) | 60 | ← | ← |

Accordingly, a protective film can prevent effectively impurities such as moisture from penetrating by adding inert gas such as argon or nitrogen to the film.

One of the constitutions disclosed by the invention is: a liquid crystal display device including a first flexible substrate, a second flexible substrate, and a liquid crystal interposed between a pair of substrates of the first flexible substrate and the second flexible substrate, comprising: an inorganic insulating film over the first flexible substrate or the second flexible substrate; and a columnar spacer for spacing evenly between the pair of substrates, wherein the pair of substrates is pasted together with sealant drawn in a closed pattern.

In the above constitution, the silicon nitride film contains argon at a concentration of from $1 \times 10^{20}$ to $1 \times 10^{21}$ cm$^{-3}$. In the above constitution, the inorganic insulating film is a silicon nitride film containing hydrogen at a concentration of at most $1 \times 10^{21}$ cm$^{-3}$. Further, in the above constitution, the inorganic insulating film is a silicon nitride film containing hydrogen at a concentration of at most $1 \times 10^{21}$ cm$^{-3}$, and oxygen at a concentration of from $5 \times 10^{18}$ to $5 \times 10^{21}$ cm$^{-3}$.

In addition, a protective film can be formed by a multilayer film of a silicon nitride film and a silicon oxide film. Another constitution of the invention is: a liquid crystal display device including a first flexible substrate, a second flexible substrate, and a liquid crystal interposed between a pair of substrates of the first flexible substrate and the second flexible substrate, comprising: an inorganic insulating film formed by a multilayer film of a silicon nitride film and a silicon oxide film over the first flexible substrate or the second flexible substrate; and a columnar spacer for spacing evenly between the pair of substrates, wherein the pair of substrates is pasted together with sealant drawn in a closed pattern.

In the above constitution, the silicon nitride film contains argon at a concentration of from $1 \times 10^{20}$ to $1 \times 10^{21}$ cm$^{-3}$.

A flexible substrate, that is, a film plastic substrate according to the invention is preferably formed by organic resin, for example, poly(ethylene terephthalate) (PET), poly(ether sulfone) (PES), poly(ethylene naphthalate) (PEN), polycarbonate (PC), nylon, polytheretherketone (PEEK), polysulfone (PSF), poly(ether imide) (PEI), polyarylate (PAR), poly(butylene terephthalate) (PBT), polypropylene, poly(propylene sulfide), poly(phenylene sulfide), poly(phenylene oxide), polyphthalamide (PDA), polyimide, or the like. Alternatively, a plastic substrate (ARTON made by JSR formed by norbomene resin with a polar group) can be used.

A dispenser device or an ink jet device may be used for dropping a liquid crystal. It is important to stabilize the amount of drops accurately for dropping within a closed seal pattern. In addition, ink jetting is a method for jetting (or dropping) a plurality of drops of minute amounts of liquid crystal to a pixel electrode. By using ink jetting, minute amounts of the liquid crystal can be freely controlled by controlling the number of discharge or the number of discharge points.

The liquid crystal is preferably dropped (or jetted) under reduced pressure to prevent impurities from penetrating thereinto. The liquid crystal will not deteriorate or not be cured even when the liquid crystal is dropped under reduced pressure. In case of dropping (or jetting) the liquid crystal under reduced pressure, a liquid crystal, which is preliminarily defoamed by reducing pressure, can be used. In addition, during dropping (jetting) the liquid crystal, a substrate is heated to deaerate the liquid crystal and to reduce the viscosity thereof. If necessary, the thickness of the liquid crystal may be uniformized by spinning after dropping the liquid crystal. The flexible substrate is preferably pasted to the opposing substrate under reduced pressure in order to prevent bubbles from entering into the liquid crystal during pasting the substrates.

One of the constitutions of the invention for obtaining the above constitution is: a method for manufacturing a liquid crystal display device including a first substrate, a second substrate, and a liquid crystal interposed between a pair of substrates of the first substrate and the second substrate, comprising the steps of: forming an inorganic insulating film over the first substrate or the second substrate by ratio frequency sputtering; forming a pixel electrode over the first substrate; forming an opposing electrode over the second substrate; forming a columnar spacer over the first substrate for spacing evenly between the pair of substrates; drawing and pre-fixating sealant over the second substrate; dropping a liquid crystal material under reduced pressure on a region surrounded by the sealant over the second substrate; heating and deaerating the liquid crystal material under reduced pressure; pasting the first substrate and the second substrate together under reduced pressure; and fixating the sealant.

In case of pasting to a device substrate provided with a seal, another constitution of the invention is: a method for manufacturing a liquid crystal display device including a first substrate, a second substrate, and a liquid crystal interposed between a pair of substrates of the first substrate and the second substrate, comprising the steps of: forming an inorganic insulating film over the first substrate or the second substrate by ratio frequency sputtering; forming a pixel electrode over the first substrate; forming an opposing electrode over the second substrate; forming a columnar spacer over the first substrate for spacing evenly between the pair of substrates; drawing and pre-fixating sealant over the first substrate; dropping a liquid crystal material under reduced pressure on a region surrounded by the sealant over the first substrate; heating and deaerating the liquid crystal material under reduced pressure; pasting the first substrate and the second substrate together under reduced pressure; and fixating the sealant.

In each constitution relating to the above manufacturing method, the first substrate or the second substrate is a plastic substrate. In the above each constitution, the inorganic insulating film is a silicon nitride film formed by ratio frequency sputtering using a silicon target. The inorganic insulating film is a silicon nitride film formed by sputtering a single crystal silicon target in an $N_2$ gas or an $N_2$ and rare gas mixture under a condition that backpressure is set at most $1\times10^{-3}$ Pa by a turbo molecular pump or a cryopump.

According to the invention, the necessary amount of the liquid crystal is dropped to only necessary portions without loss of the liquid crystal materials. A liquid crystal inlet and a liquid crystal path are not necessary since a seal pattern is a closed-loop. Therefore deterioration at the liquid crystal injection (for example, poor orientation) will be hardly occurred.

The liquid crystal material is not especially limited if the liquid crystal can only be dropped. The liquid crystal material can be mixed with photocuring materials or thermosetting material after dropping the liquid crystal in order to increase the bonding strength of a pair of substrates.

A liquid crystal is mostly oriented in TN mode, that is, the arrangement of liquid crystal molecules is twisted 90° as light passes through the liquid crystals. In case of manufacturing a liquid crystal display device of TN mode, oriented films are formed over both substrates, and rubbing treatment or the like is carried out, then, the substrates are pasted together so as to their rubbing directions are crossed each other.

As sealant, a material, which is infusible in the liquid crystal even when contacting with the liquid crystal, is preferably selected. A first seal contacting with the liquid crystal and surrounding a pixel portion can be surrounded by a second seal. In case of pasting substrates under reduced pressure, the space between the first seal and the second seal is preferably filled with filler except the liquid crystal, for example, resin.

After dropping (or jetting) the liquid crystal to both substrates, the pair of substrates can be pasted together with preventing bubbles from entering into the liquid crystal.

The pair of substrates may be spaced by forming a columnar spacer formed by resin, or mixing filler into sealant. The columnar spacer is characteristically formed by an organic resin material containing as a main component at least one material selected from the group consisting of acrylic, polyimide, polyimideamide, and epoxy; any one material of silicon oxide, silicon nitride, or silicon oxynitride; or an inorganic material composed of a laminated film of these materials.

According to the invention, after pasting substrates together, the substrate is divided into each device.

According to the invention, in the case that one liquid crystal display device is manufactured from one substrate, the process for dividing can be omitted by pasting the substrate to an opposing substrate, which is preliminarily divided into each piece. Conventionally, in order to provide a liquid crystal inlet on an edge surface, the liquid crystal inlet is provided on the edge surface after pasting and dividing the substrates.

In addition, in the above each constitution, the process for pasting the pair of substrates is carried out in inert atmosphere at atmospheric pressure or under reduced pressure. For simplification of processes, a plurality of drops of the liquid crystal is preferably jetted under reduced pressure, and a pair of substrates is preferably pasted under reduced pressure without exposing to the air.

Further, in the above each constitution, as used herein, the term "under reduced pressure" refers to in inert atmosphere of $1\times10^2$ to $2\times10^4$ Pa, or in vacuo of 1 to $5\times10^4$ Pa.

The term "under reduced pressure (also referred to as in vacuo)" refers to under the pressure that is lower than atmospheric pressure. The reduced pressure may be $1\times10^2$ to $2\times10^4$ Pa (preferably, $5\times10^2$ to $5\times10^3$ Pa) in atmosphere filled with nitride gas, rare gas, or another invert gas.

In the above each constitution, by setting appropriately the conditions for dropping a liquid crystal and a liquid crystal material, the liquid crystal material can be adhered intermittently. Alternatively, the liquid crystal material can be adhered continuously.

Further, in the above each constitution, the substrate can be heated at from room temperature (typically, 20° C.) to 200° C. (within the range that does not cause deterioration of the plastic substrate itself) during dropping the liquid crystal. The liquid crystal is deaerated by heating the substrate.

A liquid crystal display device can be broadly divided into two kinds of a passive type (a simple matrix type) or an active type (an active matrix type). The invention can be practiced in either type liquid crystal display device.

In case of an active liquid crystal display device, a TFT used for a switching element is not especially limited. As the TFT, a polysilicon TFT, which uses a semiconductor film having a crystal structure as an active film; an amorphous TFT, which uses a semiconductor film having an amorphous structure as an active layer; or an organic TFT, which uses an organic semiconductor film as an active layer. Further, as an active layer for the TFT, a semiamorphous semiconductor film (also referred to as a micro crystal semiconductor film), which has an intermediate structure between an amorphous structure and a crystal structure (including a single crystal and poly crystal); which has the third state that is free-energetically stable; and which has crystal region having short-range order and lattice distortion can be used.

The invention can be applied to any TFT structure, for example, a top gate TFT, a bottom gate TFT (inversely staggered TFT), or a staggered TFT. The invention is useful for an active liquid crystal display device. By using a single layer film of a silicon nitride film, or a lamination film of the silicon nitride film and a silicon oxide film as a protective film, TFT can be prevented from being deteriorated and offered high reliability.

According to the invention, a high reliable liquid crystal display device, which uses liquid crystal materials efficiently, and which has flexibility, becomes possible to be mass-produced.

BRIEF DESCRIPTION OF THE DRAWINGS

FIGS. 1A to 1G are explanatory views of Embodiment Mode 1;

FIGS. 11A to 11C are views for showing readers/writers explained in Embodiment 4;

DESCRIPTION OF THE INVENTION

Figure 2A:
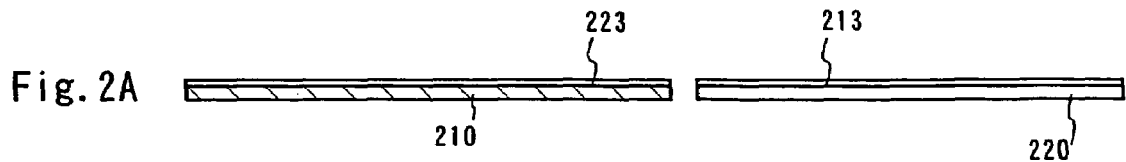
FIGS. 2A to 2G are explanatory views of Embodiment Mode 2.

Hereinafter, embodiment mode of the present invention will be explained.

Embodiment Mode 1

A second substrate 120, which serves as an opposing substrate, and a first substrate 110, which is preliminarily provided with a TFT (not shown) are prepared. The first substrate 110 and the second substrate 120 are especially not limited if they only have flexibility and are transparent to light. Typically, a plastic substrate is used for the substrates. As the TFT, any one of the following may be used: a TFT, which uses polysilicon as an active layer (also referred to as a polysilicon TFT); a TFT, which uses amorphous silicon as an active layer (also referred to as an amorphous silicon TFT); or a TFT, which uses an organic semiconductor material as an active layer (also referred to as an organic TFT).

A plastic substrate has advantages of lightweight and thin film thickness, however, the plastic substrate has poor blocking properties against moisture. Subsequently, a protective film is formed over either or both surfaces of the plastic substrate in the present invention. Here, a silicon nitride film is formed only either surface by sputtering. A dense silicon nitride film, which is formed by ratio frequency sputtering using a silicon target, prevents effectively variations or the like of threshold voltage caused by contamination of TFTs due to alkaline metals or alkaline earth metals such as natrium, lithium, or magnesium. The dense silicon nitride film has extremely high blocking properties against moisture or oxygen. In order to increase blocking properties, the content of oxygen and hydrogen in the silicon nitride film is preferably set at most 10 atomic %, more preferably, at most 1 atomic %.

As a specific sputtering conditions: an $N_2$ gas or an $N_2$ and rare gas mixture; pressures of from 0.1 to 1.5 Pa; frequencies of from 13 to 40 MHz; electric powers of from 5 to 20 W/cm$^2$, substrate temperature of from room temperature to 350° C.; distance between a silicon target (1 to 10 cm) of from 40 to 200 mm; and backpressure of at most $1 \times 10^{-3}$ Pa. In addition, heated rare gas can be sprayed on a back of the substrate.

As shown in FIG. 1A, a protective film 123 is formed over the second substrate 120, which serves as an opposing substrate, and a protective film 113 is formed over the first substrate 110. Although a TFT or the like over the first substrate are not shown in the drawings, the first substrate is provided with at least the silicon nitride film as a base insulating film, an interlayer insulating film, or a protective film of the TFT.

An opposing electrode 122 formed by a transparent conductive film is formed over the second substrate 120 serving as an opposing substrate. In addition, a pixel electrode 111 formed by a transparent conductive film is formed over the first substrate 110. A columnar spacer 115 formed by an insulating material is formed over the first substrate 110 in order to space between substrates (FIG. 1B). Orientation films (not shown) are formed over both substrates. Rubbing treatment is carried out to the both substrates.

Then, sealant 112 is drawn on the second substrate 120. As the sealant 112, acrylic photocuring resin or acrylic thermosetting resin can be used. The sealant 112 contains filler (having a diameter of from 6 to 24 μm), and has viscosity of from 40 to 400 Pa·s. The sealant is preferably infusible in a liquid crystal, which is in contact with the sealant in later. The sealant 112 is drawn as a closed loop to surround a display region. At this moment, the sealant is pre-baked (FIG. 1C).

A liquid crystal 113 is dropped within the region surrounded by the sealant 112 by a liquid crystal dispenser 118 under reduced pressure (FIG. 1D). As the liquid crystal 113, a known liquid crystal material having the degree of viscosity enough to be dropped can be used. By the liquid crystal dispenser, only necessary amount of the liquid crystal 113 can be retained without wasting the liquid crystal material within the region surrounded by the sealant 112. The liquid crystal can be dropped by ink jetting.

Then, liquid crystal is deaerated by heating under reduced pressure (FIG. 1E).

The first substrate 110 provided with a pixel portion and the second substrate 120 provided with the opposing electrode 122 or an orientation film are pasted together under reduced pressure with preventing bubbles from entering into the liquid crystal (FIG. 1F).

The sealant 112 is cured by UV irradiation or heat treatment (FIG. 1G). A heat treatment can be carried out in addition to UV irradiation.

In case of pasting the substrates under reduced pressure, the reduced pressure is gradually returned to atmospheric pressure. Further, the reduced pressure can be gradually returned to atmospheric pressure in the state that the pair of substrates is under pressure. Alternatively, after pasting the pair of substrates together under reduced pressure, the sealant can be cured by UV irradiation or heat treatment in the state that the pair of substrates is under pressure.

Accordingly, the liquid crystal is retained between the pair of substrates. In this embodiment mode, processes of dropping liquid crystal under reduced pressure, heating for deaerating, and pasting are carried out continuously. In addition, sealant can be drawn under reduced pressure.

Embodiment Mode 2

An example of drawing sealant and dropping liquid crystal on the TFT substrate side will be explained hereinafter.

As in Embodiment Mode 1, a second substrate 220, which serves as an opposing substrate, and a first substrate 210, which is provided with a TFT (not shown) are prepared. The first substrate 210 and the second substrate 220 are especially not limited if they only have flexibility and are transparent to light. Typically, a plastic substrate is used for the substrates.

Then, as in Embodiment Mode 1, a protective film 213 is formed over the second substrate 220, which serves as an opposing substrate, and a protective film 223 is formed over the first substrate 210 (FIG. 2A). Although a TFT or the like over the first substrate are not shown in the drawings, the first substrate is provided with at least the silicon nitride film as a base insulating film, an interlayer insulating film, or a protective film of the TFT.

Figure 2B:

And then, a pixel electrode 211 formed by a transparent conductive film is formed over the first substrate 210. Further, a columnar spacer 215 formed by an insulating material is formed over the first substrate 210 in order to space between substrates. An opposing electrode 222 formed by a transparent conductive film is formed over the second substrate 220 (FIG. 2B). Orientation films (not shown) are formed over both substrates. Rubbing treatment is carried out to the both substrates.

Figure 2C:

Then, sealant 212 is drawn on the first substrate 210 by a dispenser device or an ink jet device. As sealant 212, acrylic photocuring resin or acrylic thermosetting resin can be used. The sealant 212 contains filler (having diameter of from 6 to 24 μm), and has viscosity of from 40 to 400 Pa·s. The sealant is preferably infusible in a liquid crystal, which is in contact with the sealant in later. The sealant 212 is drawn as a closed loop to surround a display region. At this moment, the sealant is pre-baked (FIG. 2C).

Figure 2D:
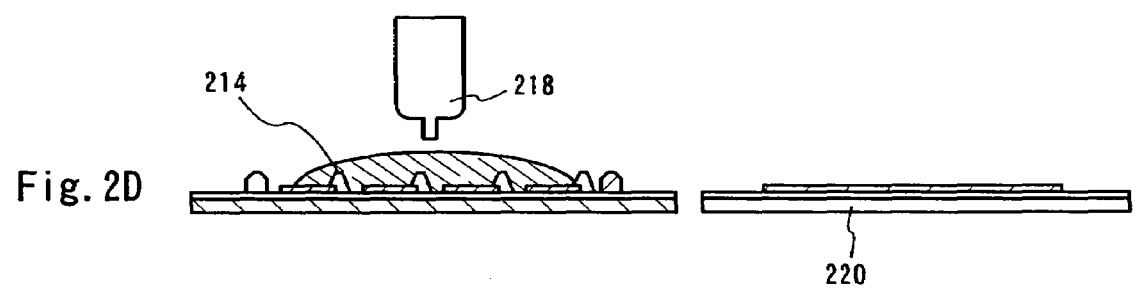

A liquid crystal 213 is dropped within the region surrounded by the sealant 212 by a liquid crystal dispenser 218 under reduced pressure (FIG. 2D). As the liquid crystal 213, a known liquid crystal material having the degree of viscosity enough to be dropped can be used. By the liquid crystal dispenser, only necessary amount of the liquid crystal 213 can be held without wasting the liquid crystal material within the region surrounded by the sealant 212. The liquid crystal can be dropped by ink jetting.

Figure 3A:
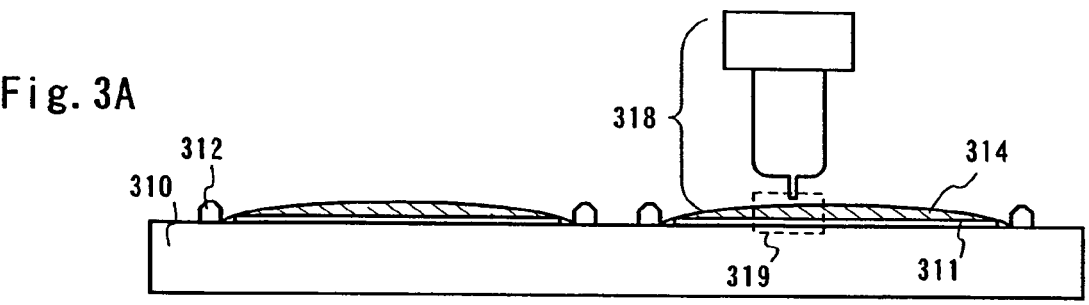
FIGS. 3A to 3C are explanatory views of Embodiment Mode 2.

FIG. 3 shows an example for manufacturing four liquid crystal display panels from one substrate. FIG. 3A is a cross-sectional view showing in course of forming a liquid crystal layer by a liquid crystal dispenser 318, in which a liquid crystal material 314 is dropped or jetted from the liquid crystal dispenser 318 so as to cover a pixel portion 311 surrounded by sealant 312. A liquid crystal layer may be formed by moving the liquid crystal dispenser 318 or moving the substrate with securing the liquid crystal dispenser 318. Alternatively, a plurality of the liquid crystal dispenser 318 can be provided to drop the liquid crystal from the plurality of the liquid crystal dispensers at a time.

Figure 3B:
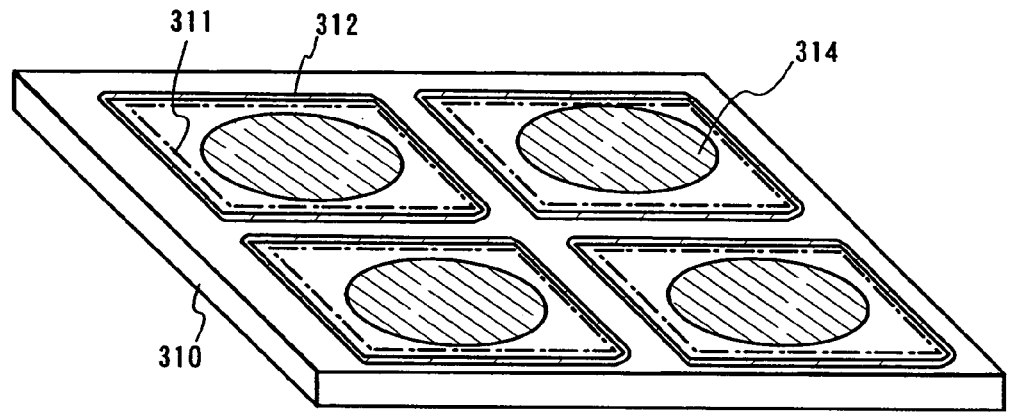

FIG. 3B is a perspective view. As shown in FIG. 3B, the liquid crystal material 314 is selectively dropped or jetted to only the region that is surrounded by the sealant 312.

Figure 3C:
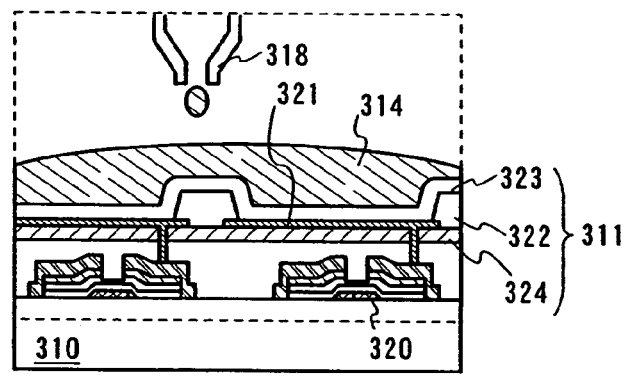

FIG. 3C is an enlarged cross-sectional view of a portion 319 surrounded by a dotted line in FIG. 3A. A liquid crystal material is dropped in accordance with the way illustrated in FIG. 3C.

In FIG. 3C, reference numeral 320 denotes an inversely staggered TFT; 321, a pixel electrode; 323, an oriented film; and 324, a protective film (a silicon nitride film formed by ratio frequency sputtering, here). The pixel portion 311, in this embodiment mode, is composed of a pixel electrode in a matrix configuration, a switching element connected to the pixel electrode, an inversely staggered TFT, and a retention volume (not shown).

Figure 2E:

Then, the liquid crystal is deaerated under reduced pressure by heating (FIG. 2E). The liquid crystal layer is heated to reduce the viscosity thereof and to uniformize the thickness thereof.

Figure 2F:
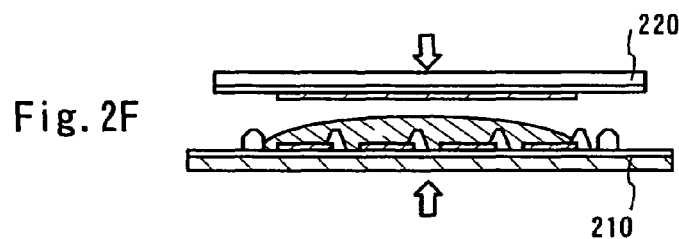

The first substrate 210 provided with a pixel portion and the second substrate 220 provided with the opposing electrode 222 or an orientation film are pasted together under reduced pressure with preventing bubbles from entering into the liquid crystal (FIG. 2F).

Figure 4A:
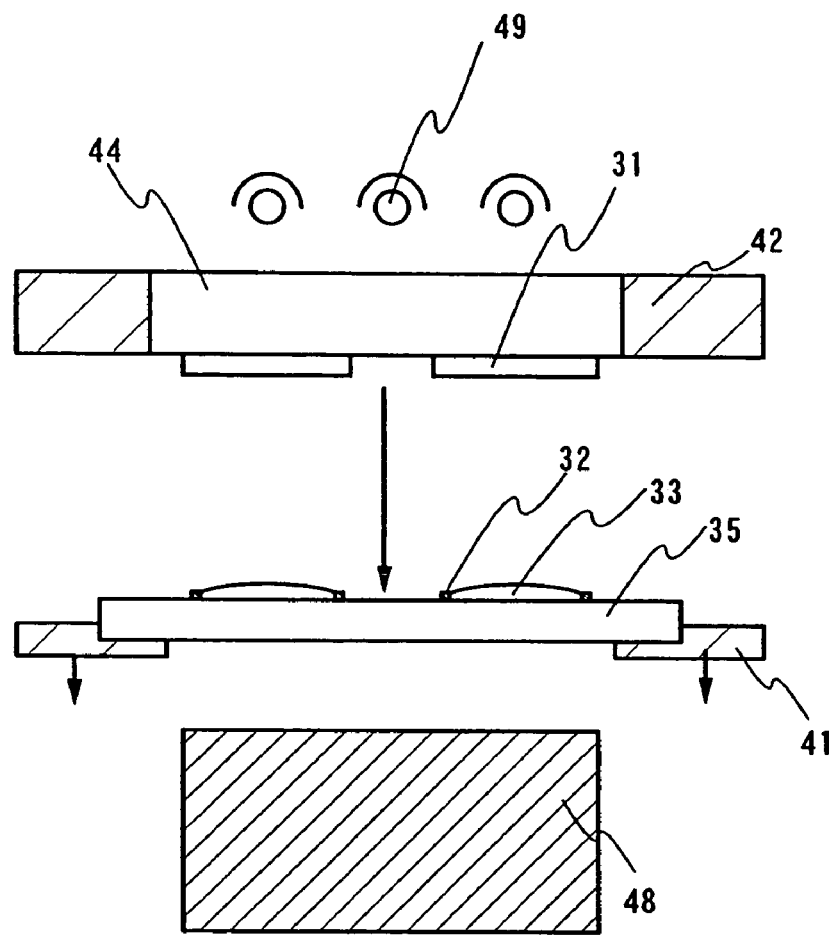
FIGS. 4A to 4B are explanatory views of Embodiment Mode 2.
Figure 4B:
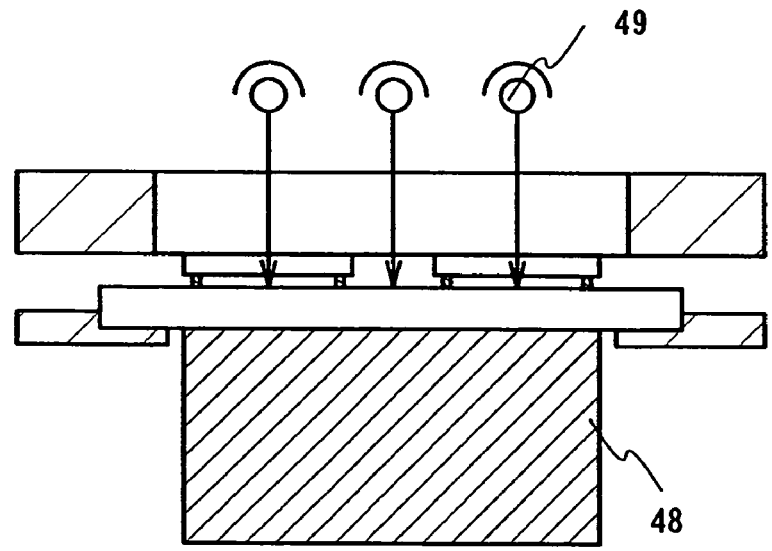
Figure 5:
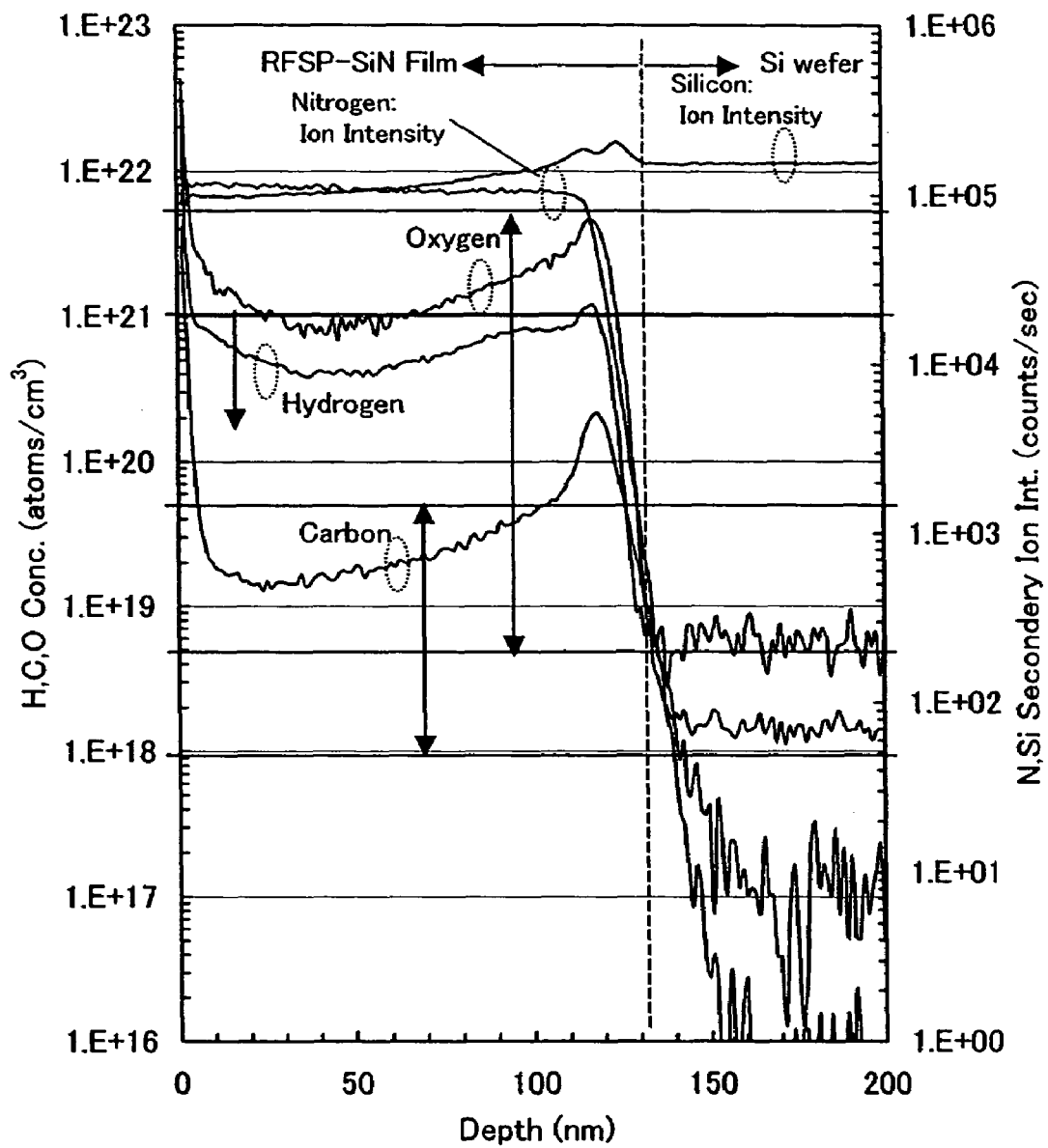
FIG. 5 shows SIMS measurement results of concentrations of C, N, O, and H in a silicon nitride film.

FIGS. 4A and 4B are views showing examples of a pasting device, which enables UV irradiation or heat treatment during pasting or after pasting.

In FIG. 4, reference numeral 41 denotes a first substrate support; 42, a second substrate support; 44, a window; 48, a bottom side machine platen; and 49, light source.

The bottom side machine platen 48 is installed with a heater to cure sealant or reduce the viscosity of a liquid crystal material. Further, the second substrate support is provided with the window 44 to pass UV light or the like from the light source 49. Although not shown in the drawings, the substrate is aligned through the window 44. A second substrate 31 serving as an opposing substrate is divided preliminarily in desired shapes. The divided substrates are secured over the support 42 by a vacuum chuck or the like. FIG. 4A shows a state of before pasting.

The first substrate support and the second substrate support are made down and a first substrate 35 and the second substrate 31 are pasted together. Then, UV light is emitted to the pair of substrates for pre-curing. FIG. 4B shows a state of after pasting.

Figure 2G:
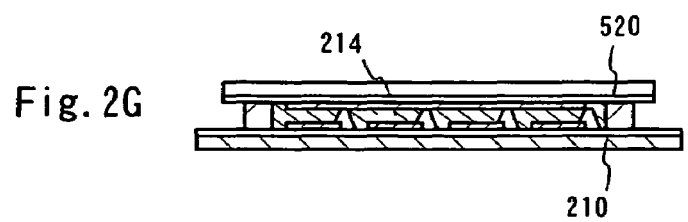

Then, the sealant 212 is completely cured by UV irradiation or heat treatment (FIG. 2G). In addition, heat treatment can be carried out in addition to UV irradiation.

In case of pasting the substrates under reduced pressure, the reduced pressure is gradually returned to atmospheric pressure. Further, the reduced pressure can be gradually returned to atmospheric pressure in the state that the pair of substrates is under pressure. Alternatively, after pasting the pair of substrates together under reduced pressure, the sealant can be cured by UV irradiation or heat treatment in the state that the pair of substrates is under pressure.

Accordingly, the liquid crystal is retained between the pair of substrates. In this embodiment mode, processes of dropping liquid crystal under reduced pressure, heating for deaerating, and pasting are carried out continuously. In addition, sealant can be drawn under reduced pressure.

In case of manufacturing four panels from one substrate as shown in FIG. 3, the first substrate is divided into four panels by a cutting device such as a scriber device, a roll cutter device, or breaker device after pasting. Four panels can thus manufactured from one substrate.

The invention composed of the above constitution will be explained in detail according to the following embodiments.

Embodiment 1

Figure 7:
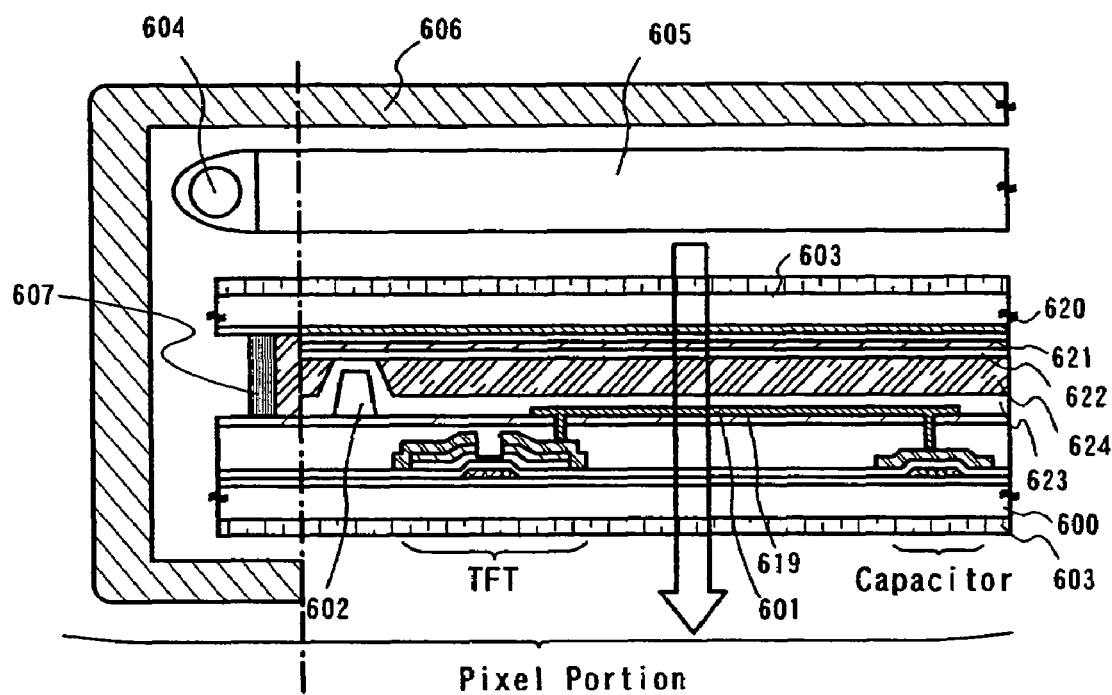
FIG. 7 is a cross-sectional view of an active matrix liquid crystal display device explained in Embodiment 1.

In this embodiment, a process for manufacturing an active matrix liquid crystal display device will be described hereinafter with reference to FIG. 7.

First, an active matrix substrate is formed by using a substrate 600, which is transparent to light. A substrate having a large size of 600 mm×720 mm, 680 mm×880 mm, 1000 mm×1200 mm, 1100 mm×1250 mm, 1150 mm×1300 mm, 1500 mm×1800 mm, 1800 mm×2000 mm, 2000 mm×2100 mm, 2200 mm×2600 mm, or 2600 mm×3100 mm is preferably used in order to reduce manufacturing costs. As a usable substrate, a barium borosilicate glass, an aluminoborosilicate glass, and the like, as typified by #7059 glass or #1737 glass produced by Corning Inc. can be used. Besides, a transparent substrate such as a quartz substrate or a plastic substrate can be also used.

After a conductive film is deposited by sputtering over a whole surface of the substrate 600 having an insulating surface, a first process of photolithography is carried out to form a resist mask over the conductive film. An unnecessary portion of the conductive film is removed by etching, thereby forming a wiring and an electrode (a gate electrode, a capacitor wiring, a terminal, and the like). In addition, a base insulating film is formed over the substrate 600, if necessary.

As a material for forming the wiring and the electrode, an element selected from the group consisting of Ti, Ta W, Mo, Cr, and Nd; alloys containing the foregoing elements as the component; or nitrides containing the foregoing elements as the components may be used. Alternatively, a plurality of the aforementioned materials is selected to form a lamination layer as the wiring and the electrode.

When a screen size is increased, the length of each the wiring will be increased, subsequently, the problem is arisen that the wiring resistance and the power consumption will be increased. Thus, in order to reduce the wiring resistance and the power consumption, the wirings and the electrodes may be formed by an element selected from the group consisting of Cu, Al, Ag, Au, Fe, Ni, and Pt; or alloys thereof.

Subsequently, a gate insulating film is formed over the whole surface by PCVD. The gate insulating film is formed by stacking a silicon nitride film and a silicon oxide film to have a thickness of from 50 to 200 nm, preferably, 150 nm. In addition, the gate insulating film is not confined to have a lamination structure. Alternatively, an insulating film such as a silicon oxide film, a silicon nitride film, a silicon oxynitride film, or a tantalum oxide film can be used for the gate insulating film.

A first amorphous semiconductor film is formed to have a thickness of from 50 to 200 nm, preferably, from 100 to 150 nm over the whole surface of the gate insulating film by known techniques such as plasma CVD or sputtering. Typically, an amorphous silicon (a-Si) film is formed into a thickness of 100 nm. In addition, when the films are formed over a large sized substrate, the chamber should be also large. Subsequently, if the inside of the chamber is evacuated, more processing time and larger amounts of film formation gases are required. Accordingly, in order to reduce costs, an amorphous silicon (a-Si) film may be formed at atmospheric pressure by linear plasma CVD device.

Thereafter, a second amorphous semiconductor film containing an impurity element having one conductive type (n-type or p-type) is formed to have a thickness of from 20 to 80 nm. The second amorphous semiconductor film including an impurity element for imparting one conductivity type (n-type or p-type) is formed over the whole surface by known techniques such as plasma CVD or sputtering. In this embodiment, the second amorphous silicon film containing an n-type impurity element is formed by using a silicon target added with phosphorus.

Next, a resist mask is formed by a second process of photolithography, and an unnecessary portion is etched away to form a first amorphous semiconductor island film and a second amorphous semiconductor island film. As an etching method, a wet etching or a dry etching can be used.

After forming a conductive layer for covering the second amorphous semiconductor island film by sputtering, a third step of photolithography is carried out to form a resist mask. Then, an unnecessary portion is etched away to form a wiring and an electrode (a source wiring, a drain electrode, a capacitor electrode, and the like). As a material for the wirings and electrodes, an element selected from the group consisting of Al, Ti, Ta W, Mo, Cr, Nd, Cu, Ag, Au, Fe, Ni, and Pt; or alloys containing these elements as components. The wirings and the electrodes can be formed by ink jetting dispersed nano particle dispersion liquid in which nano particles (having grain diameters of from 5 to 10 nm) formed by metals such as Ag, Au, Cu, or Pd are dispersed at high concentration without agglomerating. In case of forming the wirings and electrodes by ink jetting, a process of photolithography becomes unnecessary, so that the cost can be further reduced.

A resist mask is formed by a forth step of photolithography, and an unnecessary portion is etched away to form a source wiring, a drain electrode, and a capacitor electrode. As an etching method, a wet etching or a dry etching can be used. Then, a storage capacitor using an insulating film, which is formed by the same material as that of the gate insulating film, as a dielectric is formed. And then, a part of the second amorphous semiconductor film is removed in a self-alignment manner by using the source wiring or the drain electrode as a mask, and a part of the thickness of the first amorphous semiconductor film is reduced. The thinned region serves as a channel formation region of the TFT.

A silicon nitride film is formed over the whole surface to have a thickness of 150 nm as a protective film, and a silicon oxynitride film is formed over the whole surface to have a thickness of 150 nm by plasma CVD as a first interlayer insulating film. In addition, when the films are formed over a large sized substrate, the chamber should be also large. Subsequently, if the inside of the chamber is evacuated, more processing time and larger amounts of film formation gases are required. Accordingly, in order to reduce costs, the silicon nitride film may be formed as the protective film at atmospheric pressure by linear plasma CVD apparatus. Thereafter, hydrogenation is carried out to complete a channel etching TFT.

Further, a channel etch TFT is given as an example in this embodiment; however, the TFT is not limited thereto. A channel stopper type TFT, a top gate TFT, or a staggered TFT may be formed.

A second protective film 619 is formed by RF sputtering. A silicon nitride film is formed as the second protective film 619 by sputtering using a single crystalline silicon target with an $N_2$ gas or an $N_2$ and rare gas mixture under the condition that backpressure is at most $1\times10^{-3}$ Pa by using a turbo-molecular pump or a cryopump. The dense silicon nitride film prevents effectively variations or the like of threshold voltage caused by contamination of TFTs due to alkaline metals or alkaline earth metals such as natrium, lithium, or magnesium. Further, the silicon nitride film has excellent blocking properties against moisture or oxygen. The oxygen and hydrogen content in the silicon nitride film is preferably set at most 10 atomic %, more preferably, at most 1 atomic % in order to increase blocking properties.

Next, a fifth process of photolithography is carried out to form a resist mask. Then, contact holes reaching a drain electrode or a capacitor electrode are formed by dry etching. Concurrently, contact holes (not shown) for connecting electrically a gate wiring to a terminal portion may be formed in a terminal portion, and a metal wiring (not shown) for connecting electrically a gate wiring to a terminal portion may be formed. Further, concurrently, contact holes (not shown) reaching the source wiring may be formed, and a metal wiring for leading out from a source wiring may be formed. A pixel electrode such as ITO or the like may be formed after the above metal wirings are formed, or the metal wirings may be formed after the pixel electrode such as ITO or the like is formed.

A transparent electrode film is formed to have a thickness of 110 nm by an indium tin oxide (ITO), an indium oxide-zinc oxide alloy ($In_2O_3$—ZnO), zinc oxide (ZnO), or the like. Subsequently, a sixth process of photolithography and a process of etching are carried out to form a pixel electrode 601.

As described above, an active matrix substrate having a pixel portion comprising a source wiring, an inversely staggered TFT, a storage capacitor, and a terminal portion can be manufactured by six processes of photolithography.

An orientation film 623 is formed over the active matrix substrate and rubbing treatment is carried out. According to this embodiment, before forming the orientation film 623, a columnar spacer 602 for spacing between substrates is formed at the desired position by patterning an organic resin film such as an acrylic resin film. Instead of the columnar spacer, a spherical spacer may be dispersed over the whole surface of the substrate.

An opposing substrate is prepared. The opposite substrate is provided with a color filter 620 in which a coloring layer and a light-shielding layer are arranged in response to each pixel. In addition, a planarization film is provided so as to cover the color filter 620 and the light-shielding layer. Then, an opposing electrode 621 is formed by a transparent conductive film over the planarization film so as to overlap with the pixel portion. An orientation film 622 is formed over the whole surface of the opposing substrate, and rubbing treatment is carried out.

According to Embodiment 2, sealing agent is drawn so as to surround the pixel portion of the active matrix substrate by a dispenser device or an ink jet device. After drawing the sealing agent, a liquid crystal is dropped under reduced pressure on the region surrounded by the sealing agent. Then, the active matrix substrate and an opposing substrate are pasted together with a sealing agent 607 under reduced pressure without exposing the atmosphere. Filler (not shown) is mixed into the sealing agent 607. The two substrates are pasted together so as to be spaced evenly each other with the filler and a spacer 602. By a method for dropping liquid crystal, the amount of the liquid crystal used for manufacturing process can be reduced, and the cost can also be reduced drastically in case of using a large sized substrate.

Accordingly, an active matrix liquid crystal display device is completed. If necessary, the active matrix substrate and the opposing substrate are divided in desired shapes. Further, a polarizing plate 603 and an optical film such as a color filter or the like are appropriately provided. Then, an FPC is pasted to the device by a known technique.

Figure 6:
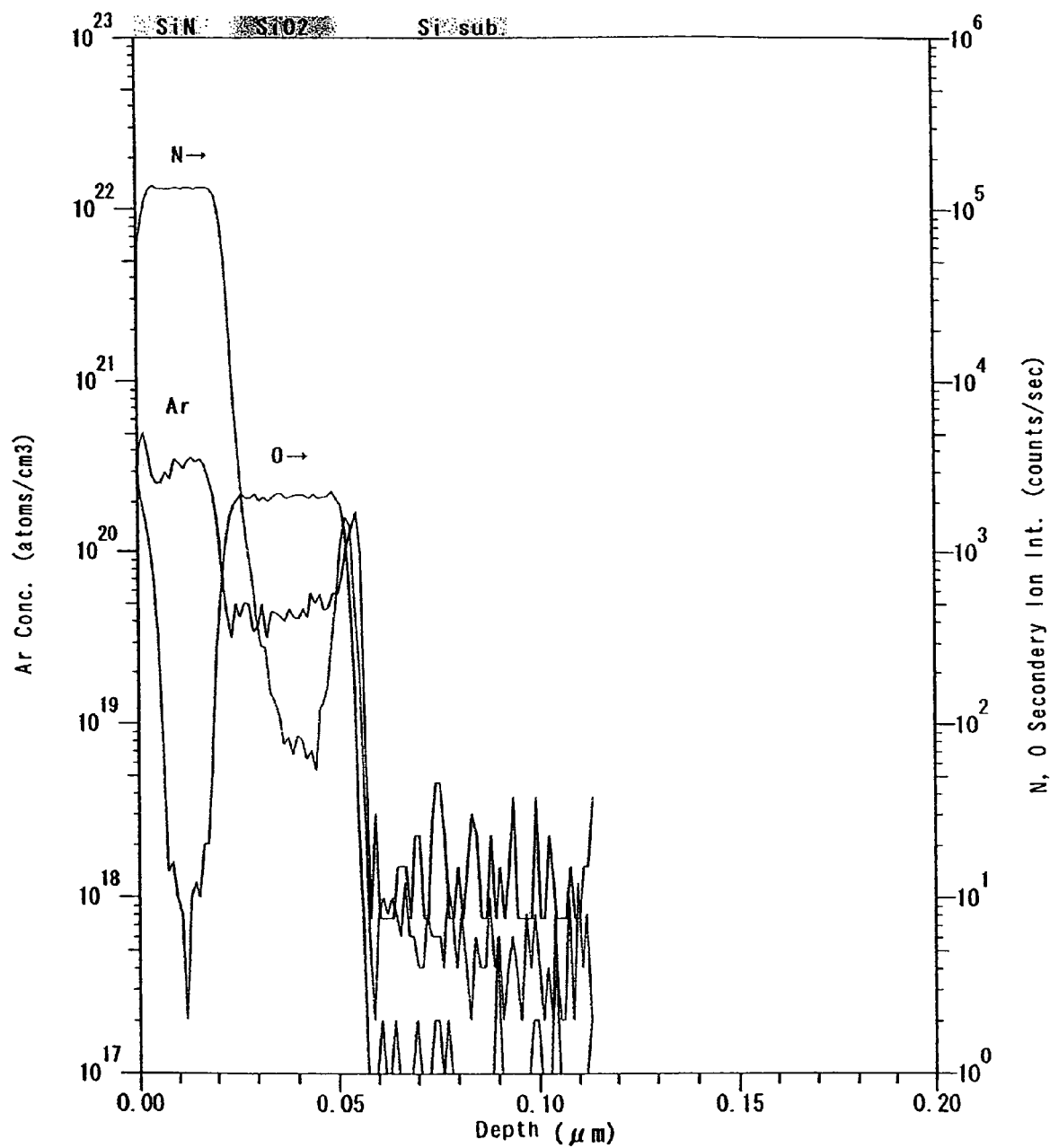
FIG. 6 shows SIMS measurement results of concentration of Ar in a silicon nitride film.

An active matrix liquid crystal display device (a transparent type) is completed in such a way that a back light 604 and a conductive plate 605 are provided to the liquid crystal module obtained according to the above processes, and the liquid crystal module is covered by a cover 606. FIG. 6 is a cross-sectional view of a part of the active matrix liquid crystal display device. The cover and the liquid crystal module are secured with an adhesive and organic resin. The polarizing plate 603 is pasted to both the active matrix substrate and the opposing substrate since the active matrix liquid crystal display device is a transparent type.

Although an example of this embodiment is a transparent active matrix liquid crystal display device. However, a liquid crystal display device is not limited thereto. A reflective type or a semitransparent type liquid crystal display device can also be manufactured. In case of obtaining a reflective type liquid crystal display device, a metal film, which has high light reflectance, typically, a material film containing aluminum or silver as a main component, or a lamination film of theses films can be used as a pixel electrode.

This embodiment can be freely combined with Embodiment 1 or Embodiment 2.

Embodiment 2

Figure 8A:
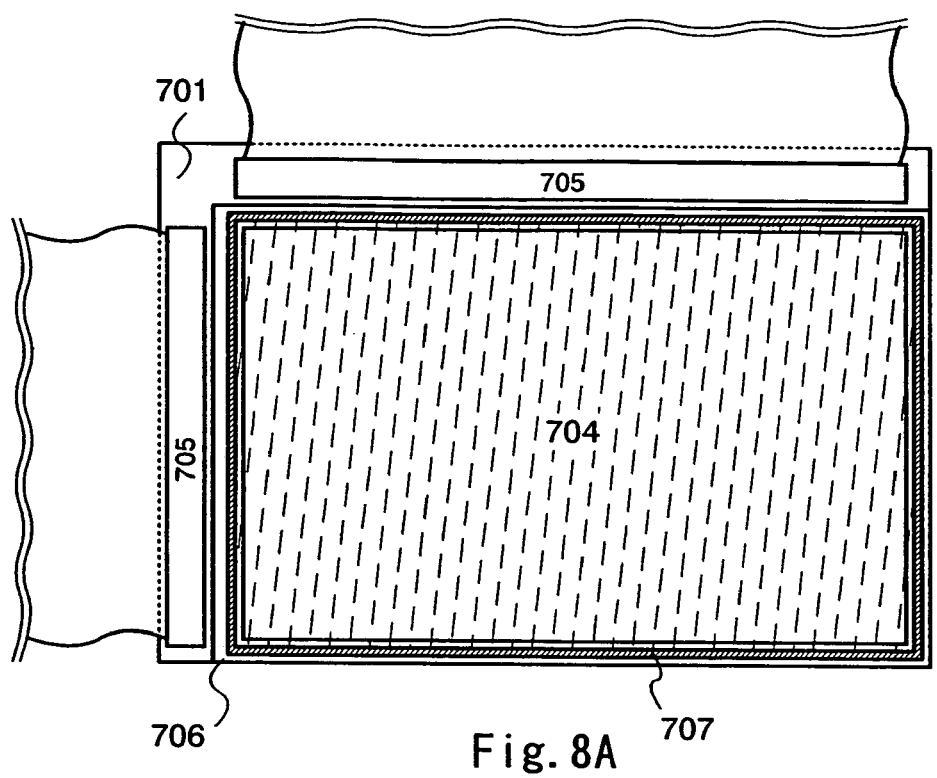
FIGS. 8A and 8B are top-views of a liquid crystal module explained in Embodiment 2.
Figure 8B:
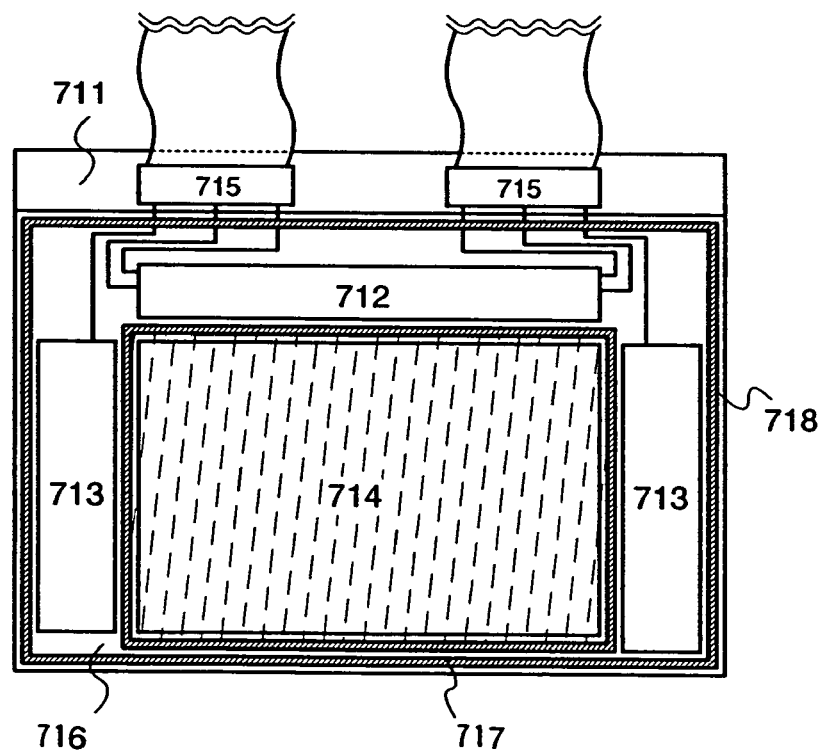

FIG. 8A is a top view of a liquid crystal module according to Embodiment 1. FIG. 8B is a top view of a liquid crystal module, which is distinguished from that described in Embodiment 1.

The TFT in which an active layer is formed by an amorphous semiconductor film according to Embodiment 1 has small field effect mobility of approximately 1 $cm^2/Vsec$. Therefore a drive circuit for displaying images is formed by IC chip and mounted by TAB (Tape Automated Bonding) or COG (Chip On Glass).

In FIG. 8A, reference numeral 701 denotes an active matrix substrate; 706, an opposing substrate; 704, a pixel portion; 707, a sealing agent; and 705, an FPC. A liquid crystal is dropped by a dispenser device or an ink jet device, and a pair of substrates 701, 706 is pasted together with a sealing agent 707.

Though the TFT according to Embodiment 1 has small field effect mobility, in case of mass-producing using large sized substrates, the cost for manufacturing the TFT can be reduced since the manufacturing process is carried out at low temperature. According to the present invention, that is, the liquid crystal is dropped by a dispenser or an ink jet device, and a pair of substrates is pasted together; a pair of substrates becomes possible to hold liquid therebetween regardless of their sizes, so that a display device provided with a liquid crystal panel having a large sized screen of from 20 to 80 inches can be manufactured.

In case of forming an active layer by a semiconductor film, typically, by a polysilicon film, which is formed by crystallizing an amorphous semiconductor film to obtain a crystalline structure by a known crystallization treatment, a TFT which has high field effect mobility can be obtained, and a driver circuit having not only a driver circuit but also a CMOS circuit can be formed over the same substrate. In addition, a CPU or the like can be manufactured over the same substrate in addition to a driver circuit.

In case of using a TFT having an active layer formed of a polysilicon film, a liquid crystal module shown in FIG. 8B can be manufactured.

In FIG. 8B, reference numeral 711 denotes an active matrix substrate; 716, an opposing substrate; 712, a source signal driver circuit; 713, a gate signal driver circuit; 714, a pixel portion; 717, a first sealing agent; and 715, an FPC. A liquid crystal is dropped by a dispenser device or an ink jet device, and a pair of substrates 711, 716 is pasted together with the first sealing agent 717 and a second sealing agent. Only the pixel portion 714 holds the liquid crystal since the driver circuits 712, 713 do not need the liquid crystal. Accordingly, the second sealant 718 is provided in order to reinforce an overall panel.

This embodiment can be freely combined with Embodiment Mode 1, Embodiment Mode 2, or Embodiment 1.

Embodiment 3

Though example of manufacturing an active matrix substrate in which switching elements are formed directly on a plastic substrate, which has flexibility, was described in Embodiment 1 and Embodiment 2, an example of peeling a device from a glass substrate to transfer to a flexible substrate will be described in this embodiment.

Figure 9A:
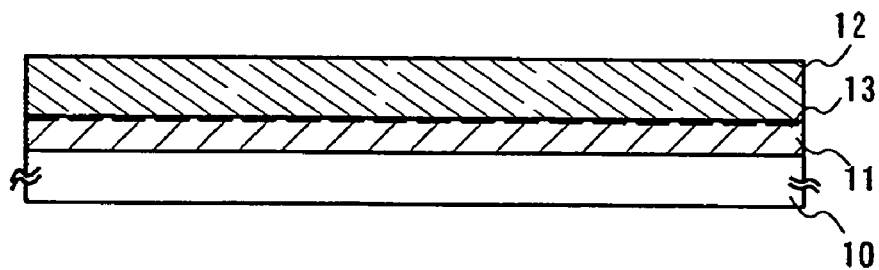
FIGS. 9A to 9E are views showing a process for exfoliation explained in Embodiment 3.

As shown in FIG. 9A, a metal film 11 is formed over a first substrate 10. In addition, the first substrate has only to have enough rigidity to resist a process for peeling in later, for example, a glass substrate, a quartz substrate, a ceramic substrate, a silicon substrate, a metal substrate, or a stainless substrate can be used for the first substrate. The metal film can be formed by a single layer, which is formed by an element selected from the group consisting of W, Ti, Ta, Mo, Nd, Ni, Co, Zr, Zn, Ru, Rh, Pd, Os, and Ir, an alloy material or a compound material, each of which is mainly containing these elements; or a lamination layer of the single layers. As a method for manufacturing the metal film, sputtering using a target of metals can be used. The metal film may be formed to have a thickness of from 10 to 200 nm, preferably, from 50 to 75 nm.

Instead of the metal film, a film of the above metals, which are nitrided (for example, nitride tungsten or nitride molybdenum), can be formed. Further, instead of the metal film, a film of alloys of the above metals (for example, alloys of W and Mo: $W_xMo_{1-x}$) can be formed. In this instance, these films may be formed by sputtering using a plurality of targets such as a first metal (W) and a second metal (Mo) provided in a film formation chamber, or using a target of an alloy of the first metal (W) and the second metal (Mo). Further, nitride or oxygen can be doped to these films. As a method for doping, for example, ion implantation can be used. Alternatively, the metal film can be formed in the presence of nitrogen or oxygen in the film formation chamber by sputtering using a target of nitride metals.

In case of forming the metal film by sputtering, the thickness of the periphery of the substrate becomes sometimes uneven. Therefore the film at the periphery is preferably removed by dry etching, in this regard, an insulating film having nitrogen such as silicon nitride oxide film, silicon oxynitride film, or the like may be formed to have a thickness of 100 nm between the first substrate 10 and the metal film 11 in order to prevent the first substrate from etching away.

Setting appropriately the way of forming the metal film can control the process for peeling and widen the margin of the process. That is, for example of using metal alloys, controlling the composition ratio of each metal in the alloys can control the process for peeling. Specifically, the temperature for peeling and necessity or not of the heating treatment can be controlled.

Thereafter, a separation layer 12 is formed over the metal film 11. The separation layer comprises an oxide film having silicon and a semiconductor film, and may comprise an antenna in case of noncontact type IC. An insulating film having nitrogen such as a silicon nitride (SiN) film, a silicon nitride oxide (SiNO) film, a silicon oxynitride (SiON) film, or the like is preferably provided as a base film below the separation layer 12, especially, the semiconductor film.

As an oxide film having silicon, a silicon oxide film, a silicon oxynitride film, or the like may be formed by sputtering or CVD. The oxide film having silicon is preferably formed to have approximately a thickness at least twice as large as the metal film. In this embodiment, a silicon oxide film is formed by sputtering using a silicon target to have a thickness of from 150 to 200 nm.

When forming the oxide film having silicon, an oxide having the above-mentioned metals (metal oxide) 13 is formed over the metal film. As the metal oxide, a thin metal oxide may be used, which is formed by treating the metal oxide by solution having sulfuric acid, hydrochloric acid, or nitric acid; mixed solution of the above solution and hydrogen peroxide solution; or ozone water. As another method, plasma treatment in the presence of oxygen; or oxidation treatment in the presence of oxygen with ozone generated by ultra violet irradiation can be adopted. Alternatively, the metal oxide having silicon can be formed by heating in a clean oven at approximately from 200 to 350° C.

The metal oxide is formed to have a thickness of from 0.1 nm to 1 μm, preferably, 0.1 to 100 nm, more preferably, 0.1 to 5 nm.

As used herein, the term "insulating film" refers collectively to the oxide film having silicon, the base film, or the like, each of which is formed between the semiconductor film and the metal film. That is, the structure comprises, in sequence, at least a metal film, a metal oxide, an insulating film, and a semiconductor film. Specifically, the semiconductor film may be provided over either surface of the insulating film, and the metal oxide and the metal film may be provided over another surface of the insulating film.

A semiconductor device, for example, a thin film transistor (TFT), an organic TFT, a thin film diode, or the like, is formed to the semiconductor film by a predetermined process. A CPU, a memory, or the like, of a thin film integrated circuit is composed of the semiconductor device. Further, in order to protect the semiconductor device, a protective film having carbon such as a diamond like carbon (DLC), carbon nitride (CN), or the like; or a protective film having silicon nitride (SiN), silicon nitride oxide (SiNO), or silicon oxynitride (SiON) is preferably formed over the semiconductor device.

After forming the separation film 12 according to the aforementioned manner, specifically, after forming the metal oxide, the metal oxide is crystallized by appropriate heat treatment. For example, in case of using tungsten (W) for the metal film, a metal oxide of $WO_2$ or $WO_3$ becomes crystallized by heat treatment at least 400° C. In addition, if the heat treatment is carried out after forming the semiconductor film included in the separation layer 12, hydrogen contained in the semiconductor film can be diffused. Due to the hydrogen, the valency of the metal oxides is sometimes changed. The necessity or not of such heat treatment or the temperature can be determined depending on the selected metal film. Therefore the metal oxide may be crystallized as needs arise in order to facilitate exfoliation.

The process for manufacturing the semiconductor device can serve as well as the heat treatment. For example, the heat treatment can be carried out by using a heating furnace or laser irradiation, each of which is used for forming a crystalline semiconductor film.

Figure 9B:
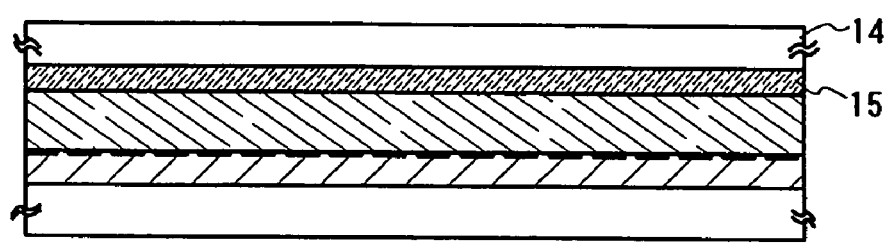

Next, as shown in FIG. 9B, a second substrate 14 is pasted onto the separation layer 12 with a first adhesive 15. It is desirable that the second substrate 14 has higher rigidity than that of the first substrate 10. As the first adhesive 15, a removable adhesive, for example, a UV peeled adhesive, a thermal peeled adhesive, or a water peeled adhesive, or a two-sided tape can be used.

Figure 9C:
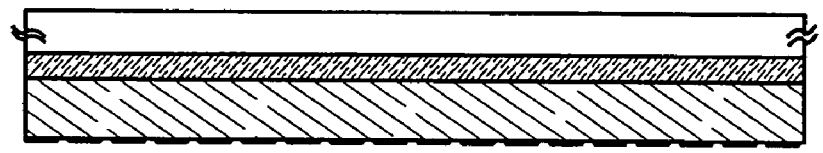

The first substrate 10 provided with the metal film 11 is separated by a physical means (FIG. 9C). Although not shown in the schematic view, the first substrate is separated by internal and/or interfacial exfoliation of the crystallized metal oxide. Accordingly, the first substrate 10 can be separated from the separation layer 12.

In order to facilitate the exfoliation, a part of the substrate is severed. Then, the vicinity of the interface on the severed surface of the metal film and the metal oxide may be scratched by a cutter.

Figure 9D:
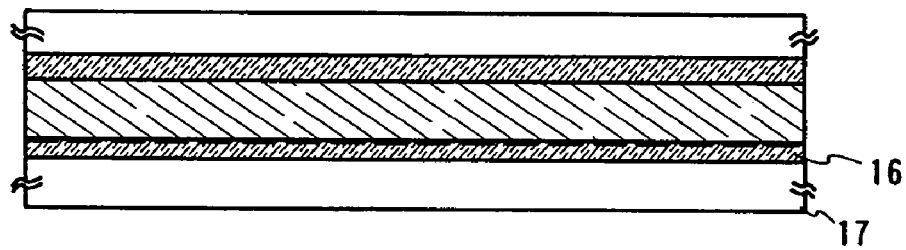

Then, as shown in FIG. 9D, the separation layer 12 is pasted onto a third substrate (for example, a label), which serves as a transfer member, with a second adhesive 16. As the second adhesive 16, UV cured resin, specifically, an epoxy resin adhesive or resin additive adhesive, or two-sided tape can be used. In case of the third substrate has adhesion properties, the second adhesive is not needed.

As the third substrate, a paper; or a substrate having flexibility formed by a plastics material (film substrate) such as poly(ethylene terephthalate), polycarbonate, poly arylate, poly(ether sulfone) can be used. In addition, by coating the film substrate, the rigidity, the resistance properties, and the stability may be improved, moreover, the irregularities of the surface may be reduced.

Figure 9E:

Then, the first adhesive 15 is removed to separate the second substrate 14 (FIG. 9E). Specifically, the first adhesive is removed by emitting UV light, heating, or water washing.

Removing the first adhesive and curing the second adhesive can be carried out within one process. For example, in case that thermal peeled resin and thermal cured resin, or UV peeled resin and UV cured resin are used as the first adhesive and the second adhesive, respectively, removing and curing the adhesives can be carried out by one-time heating or UV light irradiation. In addition, an implementer selects appropriately adhesive in consideration of the light transmission properties of the third substrate.

A thin film integrated circuit is thus completed over a flexible substrate. According to this embodiment, an active matrix substrate which is completed by peeling a switching element having high electric properties formed over a glass substrate and transferring to a plastic substrate.

The metal oxide 13 may be entirely removed in the thin film integrated circuit. Alternatively, a part of or most parts of the metal oxide 13 may be remained over undersurface of the separation layer. In this instance, the remained metal oxide may be removed by etching. Further, the oxide film having silicon can also be removed.

The following process is for manufacturing a liquid crystal display device according to Embodiment Mode 1 or Embodiment Mode 2.

Embodiment 4

In this embodiment, an example that a separation layer including a CPU or memory is formed over a substrate having an insulating surface (typically, a glass substrate or a quartz substrate), and is transferred to a plastic substrate by peeling and transferring techniques described in Embodiment 3 will be explained with reference to FIGS. 10A to 10C.

Figure 10A:
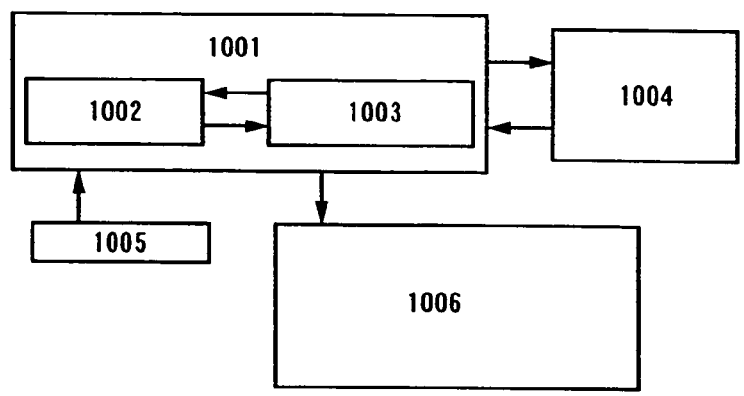
FIGS. 10A to 10D are views for showing a card type semiconductor device explained in Embodiment 4.

In FIG. 10A, reference numeral 1001 denotes a central processing unit (also referred to as a CPU); 1002, a control unit; 1003, an arithmetic unit; 1004, a memory unit (also referred to as memory); 1005, input unit; and 1006, output unit (display unit).

The central processing unit 1001 comprises the arithmetic unit 1003 and the control unit 1002. The arithmetic unit 1003 is composed of an arithmetic logic unit (ALU) for carrying out an arithmetic operation such as addition and subtraction, and a logic operation such as AND, OR, NOT; various resistors for storing the data and the results of operation; a counter for counting the number of "1", which is inputted, or the like. A circuit composing the arithmetic circuit 1003, for example, an AND circuit, an OR circuit, a NOT circuit, a buffer circuit, or a resistor circuit can be composed of TFTs. In order to obtain high electric field effect mobility, a semiconductor film, which is crystallized by continuous wave laser light, may be formed as an active layer of a TFT.

A tungsten film and a silicon oxide film are formed by sputtering over a substrate, and a base insulating film (a silicon oxide film, a silicon nitride film, or a silicon oxynitride film) is formed thereon, then, an amorphous silicon film is formed thereon. Further, exfoliation is carried out in later processes by using a tungsten oxide film formed over an interface of the tungsten film and silicon oxide film.

As a method for crystallization, any one of the following methods can be used. After adding metal elements serving as a catalyst into an amorphous silicon film, the amorphous silicon film is heated to be formed into a polysilicon film, and the polysilicon film is irradiated with pulsed wave laser light. Continuous wave laser light is emitted to an amorphous silicon film obtain a polysilicon film. After obtaining a polysilicon film by heating an amorphous silicon film, continuous laser light is emitted to the polysilicon film. An amorphous silicon film is doped with metal elements serving as a catalyst, and heated to be formed into a polysilicon film, then, continuous laser light is emitted to the polysilicon film. Further, in case of using continuous laser light, the scanning direction of a laser beam is preferably along with the channel length direction of the TFT, which is composed of the arithmetic unit 1003, the control unit 1002, or a memory unit 1004.

The control unit 1002 executes command stored in the memory unit 1004 to control overall semantics. The control unit 1002 comprises a program counter, a command resistor, and a control signal generating unit. Further, the control unit 1002 can be composed of TFTs, in this instance, a crystallized semiconductor layer can be formed as an active layer of the TFTs.

The memory unit 1004 stores data and command for arithmetic such as data and programs for executing frequently in CPU. The memory unit 1004 comprises a main memory, an address resistor, and a data resistor. A cash memory can be used in addition to the main memory. Such memory can be formed by SRAM, DRAM, flash memory, or the like. In case that the memory unit 1004 is composed of TFTs, a crystallized semiconductor film can be formed as an active layer.

The input unit 1005 loads data or programs from outside. The output unit 1006 is, typically, a display device for displaying results.

The separation layer having thus obtained CPU (including a terminal electrode and a leading out wiring) is peeled from the substrate and transferred to the plastic substrate.

In addition, not only the CPU but also a current circuit, a display unit, and a driver circuit unit can be formed. For example, a card having a noncontact thin film integrated circuit can be manufactured.

Figure 10B:
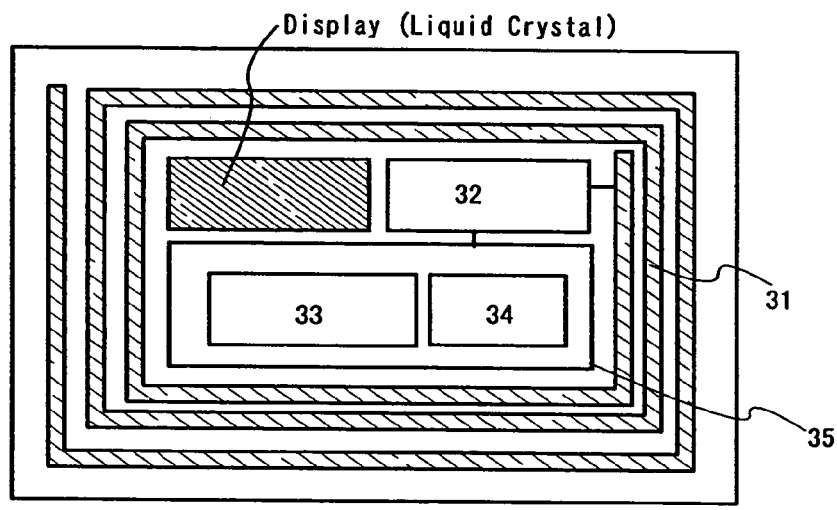

FIG. 10B is a view showing a noncontact thin film integrated circuit.

FIG. 10B is a top view showing the specific structure of the noncontact thin film integrated circuit. The noncontact thin film integrated circuit comprises a display unit, an antenna 31, a current circuit 32, an integrated circuit unit 35 including a CPU 33, a memory 34, or the like, in which the antenna is connected to an IC via the current circuit. The current circuit 32 comprises at least a diode and a capacitor, and converts the alternate current wavelength received by an antenna into the direct current. The antenna 31 can be formed within the same process for forming the integrated circuit.

A noncontact IC is characteristically supplied with an electric current by inductive coupling (electromagnetic induction type), mutual coupling (electromagnetic coupling type), or capacitive coupling (electrostatic coupling type), of a coiled antenna. A received frequency can be selected by controlling the number of coil windings.

The frequency of remote coupling is micro wave; vicinity and proximity, 13.56 MHz; and close coupling, 4.91 MHz, generally. The number of coil windings can be reduced by increasing frequency and reducing wavelengths.

Compared with a contact thin film integrated circuit, a noncontact thin film integrated circuit is unbreakable, highly durable, and almost-error-free, since the noncontact thin film integrated circuit carries out power source supplying and information communication with making noncontact to reader/writer. The structure of the reader/writer is simple. Further, the noncontact thin film integrated circuit is easy to use, since what is necessary is to hold up a card to the reader/writer.

A noncontact integrated circuit comprises a CPU, a memory, an I/O port, and a coprocessor, and exchanges data via a path. Further, IC has RF (radio transmission) interface and noncontact interface. The reader/writer for reading comprises noncontact interface and an interface circuit, and carries out information communication or information exchange between each interface circuit. Then, information communication or information exchange is carried out by the interface circuit of the reader/writer with a host computer. Needless to say, a host computer can have a function of the reader/writer.

Figure 10C:
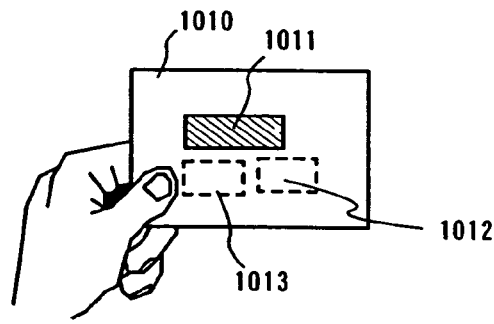

FIG. 10C is an external view of a plastic card corresponding to FIG 10B. In FIG. 10C, reference numeral 1010 denotes a main body of a plastic card; 1011, a display unit of a reflective liquid crystal; 1012, a memory unit; and 1013, a CPU. In case of using the plastic card as an identification card, the weight can be lighten, and the shape can be flexible. Further, when the card becomes into useless, it is possible to shred easily to make information in the memory unit be unreadable and prevent the card forgery.

FIGS. 11A to 11C are views showing examples of various forms for reading the information of a card. As shown in FIG. 11A, a card 72 installed with a thin film integrated circuit is held to a sensor unit 71 of a reader/writer 70.

As shown in FIG. 11B, a reader is installed with a portable information terminal owned by individual, for example, a cellular phone 80, and a card 82 is held to a sensor unit 81 provided to a part of the main body to display the information on a display unit 83.

In addition, as shown in FIG. 11C, a card 92 installed with a thin film integrated circuit is held to a sensor unit 91 of a reader 90, which is portable and owned by individual, to display information on a display unit 93.

Though a noncontact reader/writer was explained in this embodiment, a contact type can be adopted if it can display information on a display unit. Information may be displayed on a display unit of the card itself installed with a noncontact or contact thin film integrated circuit.

Figure 10D:
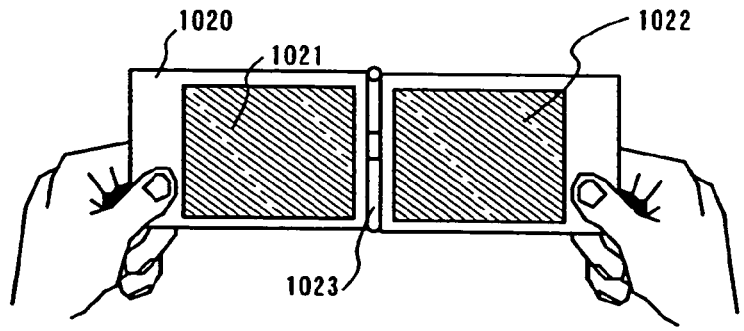

FIG. 10D is a view of an example of a portable information terminal having a plurality of liquid crystal display units.

The device shown in FIG. 10D can be folded at a fold moving part 1023, and formed to have a business card size. A main body, a plastic 1020, is of lightweight plastic materials. The device comprises a left side display unit 1021 and a right side display unit 1022. An integrated circuit such as a CPU may be provided to the plastic 1020.

This embodiment can be freely combined with Embodiment Mode 1, Embodiment Mode 2, Embodiment 1, Embodiment 2, or Embodiment 3.

Embodiment 5

A method for manufacturing an organic TFT by organic materials will be described in this embodiment with reference to FIGS. 12A to 12F.

Figure 12A:
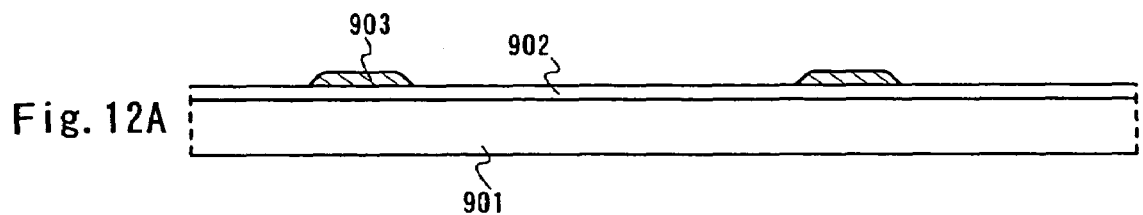
FIGS. 12A to 12F are views for showing a process for manufacturing an organic TFT explained in Embodiment 5.

As shown in FIG. 12A, a substrate 901 having an insulating surface is prepared. This substrate has at least properties of flexibility and light transmission, and is formed by the plastic selected form the group consisting of poly(ethylene terephthalate) (PET), poly(ethylene naphthalate) (PEN), poly(ether sulfone) (PES), polycarbonate (PC), and polyimide. The thickness of the substrate 901 is practically from 10 to 200 mm.

Then, a barrier layer 902 is formed over a substrate 901. The barrier layer 902 may be formed by a silicon nitride without containing hydrogen, which is formed by RF sputtering, or a multilayer film composed of the silicon nitride and silicon oxide. The barrier layer can prevent moisture or biogenic gas from penetrating into TFTs from external environment, and so can prevent deterioration of an organic semiconductor material.

A first conductive film is formed by a conductive paste as a gate electrode 903 of a TFT over the barrier layer 902. As the conductive paste, a conductive carbon paste, a conductive silver paste, a conductive copper paste, a conductive nickel paste, or the like is used. The first conductive film is formed into a predetermined pattern by screen-printing, roll-coating, or ink-jetting. The first conductive layer is formed into a predetermined pattern by the conductive paste, and leveled, then, dried, and then, cured at 100 to 200° C.

Figure 12B:
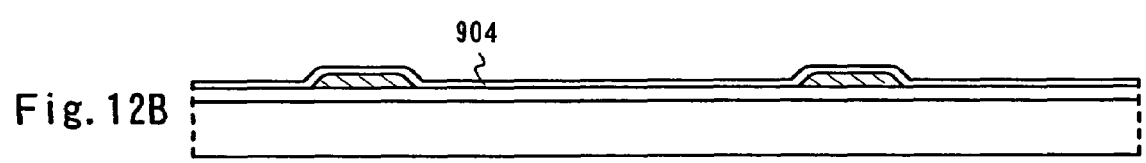

As shown in FIG. 12B, a first insulating film is formed over the gate electrode 903 as a gate insulating film 904. In addition, the first insulating film is formed by a material added with acrylic resin, polyimide resin, polyamide resin, phenoxy resin, nonaromatic polyfunctional isocyanate, and melamine resin by roll-coating, spraying, or the like. In consideration of the gate voltage, the gate insulating film is preferably formed to have a thickness approximately of from 100 to 200 nm.

Figure 12C:
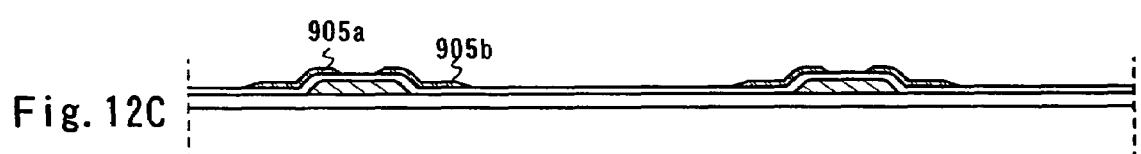

Then, as shown in FIG. 12C, the second conductive film is formed over the gate insulating film 904 as a source electrode 905a or a drain electrode 905b. As a material for the second conductive film, it is desired to use metals having a large work function for making an ohmic contact with the semiconductor layers, since many organic semiconductor materials are p-type semiconductors in which materials for transporting electric charges transport positive holes as carriers. Concretely, the second conductive film is formed by conductive paste including metals such as gold, platinum, chrome, palladium, aluminum, indium, molybdenum or nickel, or alloys thereof by printing or roll coating.

Figure 12D:
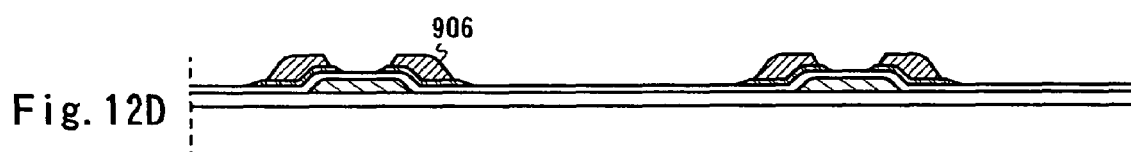

Subsequently, as shown in FIG. 12D, the second insulating film provided as a bank 906 is formed over the source electrode 905a or the drain electrode 905b. In addition, the second insulating film is formed by a material added with acrylic resin, polyimide resin, polyamide resin, phenoxy resin, non-aromatic polyfunctional isocyanate, and melamine resin by screen printing so as to form an opening portion on top of the gate electrode in order to fill the organic semiconductor film therein. Further, the source electrode or the drain electrode can be formed after forming a bank.

Thereafter, an organic semiconductor film is formed. In case of forming the organic semiconductor film by a high molecular material, dipping, casting, bar coating, spin coating, spraying, ink jetting, or printing can be appropriately used as a method for forming the film. As an organic semiconductor material, an organic molecular crystal or an organic polymer material can be used. Given as specific examples of the molecular crystal: polycyclic aromatic compounds, conjugate double bond compounds, carotene, macrocycle compounds, complexes thereof, phthalocyanine, electromigration complexes, tetrathiofulvalene (TCNQ complexes), free radical, diphenylpicrylhydrazyl, coloring matter, or protein. Given as specific examples of the organic polymer material: π conjugate polymer, CT complexes, polyvinyl pyridine, iodine, phthalocyanine metal complexes, or the like. Especially, π conjugate polymer having a skeleton which is composed of conjugate double bonds, such as polyacetylene, polyaniline, polypyrrole, polythienylene, polythiophene derivatives, poly(3-hexylthiophene) (P3HT, that is, polymer of polythiophene derivatives in which flexible alkyl group, which is hexil group, is introduced to three positions of polythiophene), poly(3-alkylthiophene), poly(3-docosylthiophene), polyparaphenylene derivatives, or polyparaphenylene vinylene derivatives is preferably used as the organic polymer material.

An organic semiconductor film formed by a small molecular material may be formed by vapor deposition. For example, a thiophene oligomer film (degree of polymerization is 6), a pentacene film, or the like may be formed.

Figure 12E:
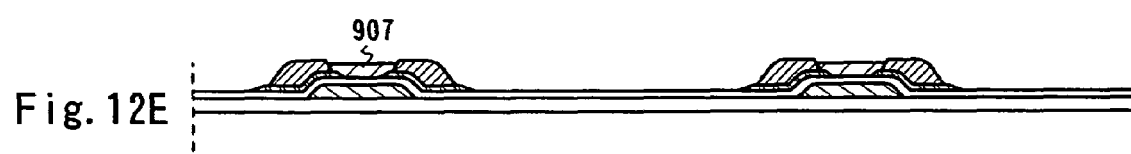

In case that a large sized substrate is used, or the first substrate and the second substrate are elastic, a semiconductor film is preferably formed by dropping solution. Then, as shown in FIG. 12E, an organic semiconductor film 907 is completed by leaving naturally and baking.

Figure 12F:
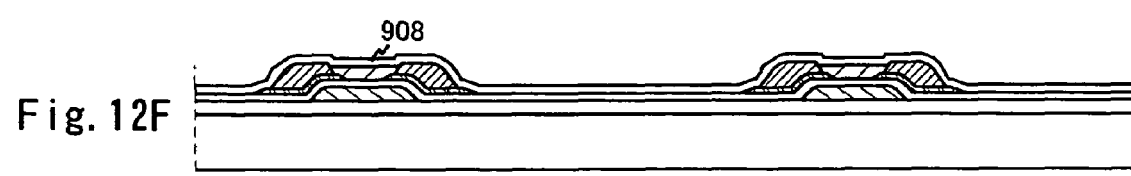

Next, as shown in FIG. 12F, a passivation film 908 is formed. A silicon nitride film, a silicon oxynitride film, or the like is formed by insulating materials containing silicon by RF sputtering as the passivation film.

Thereafter, a source electrode, a drain electrode, a gate electrode and are made contact and connected to each wiring between a device substrate and a TFT to form a semiconductor device. Further, a liquid crystal display device (a liquid crystal display module) may be completed by dropping a materials according to Embodiment Mode 1 or Embodiment Mode 2.

Accordingly, a semiconductor device (specifically,. a liquid crystal display device) having flexibility can be obtained in terms that an organic TFT can be formed to be a light weight since the overall of the TFT is formed by organic compound materials.

Especially, the organic TFT according to this embodiment can be applied to a system on panel on which a pixel portion for displaying visually on one panel; a communication facility for sending and receiving various information; a computer for storing or processing information; or the like.

This embodiment can be freely combined with Embodiment Mode 1, Embodiment Mode 2, Embodiment 1, Embodiment 2, Embodiment 3, or Embodiment 4.

Embodiment 6

Electronic equipment can be manufactured by incorporating a liquid crystal display device according to the present invention. Given as examples of the electronic equipment are a video camera, a digital camera, a goggle type display (head mounted display), a navigation system, an audio reproducing apparatus (car audio, an audio component, and the like), a laptop computer, a game machine, a portable information terminal (a mobile computer, a cellular phone, a portable game machine, an electronic book, etc.), and an image reproducing apparatus including a recording medium (specifically, an apparatus capable of processing data in a recording medium such as a Digital Versatile Disk (DVD) and having a display that can display the image of the data). Practical examples thereof are shown in FIGS. 13A to 13H.

Figure 13A:
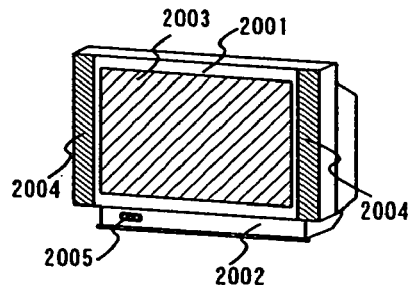
FIGS. 13A to 13H are examples of electronic equipment explained in Embodiment 6.

FIG. 13A shows a television, which comprises a casing 2001, a supporting base 2002, a display portion 2003, speaker units 2004, a video input terminal 2005, etc. The present invention is applied to the display portion 2003. As used herein, the term "television" includes every television for displaying information such as one for a personal computer, one for receiving TV broadcasting, and one for advertising.

Figure 13B:
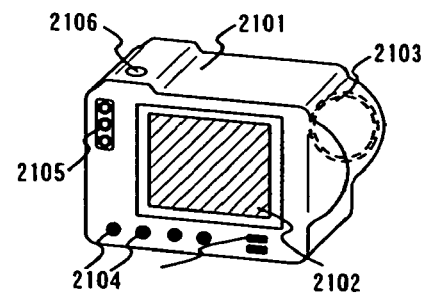

FIG. 13B shows a digital camera, which comprises a main body 2101, a display portion 2102, an image receiving unit 2103, operation keys 2104, an external connection port 2105, a shutter 2106, etc. The present invention is applied to the display portion 2102.

Figure 13C:
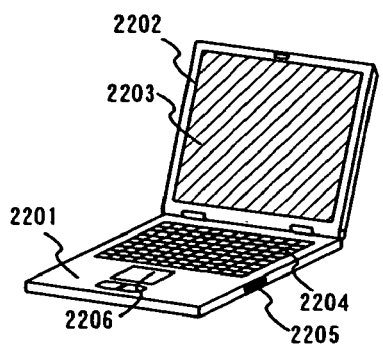

FIG. 13C shows a laptop computer, which comprises a main body 2201, a casing 2202, a display portion 2203, a keyboard 2204, an external connection port 2205, a pointing mouse 2206, etc. The present invention is applied to the display portion 2203.

Figure 13D:
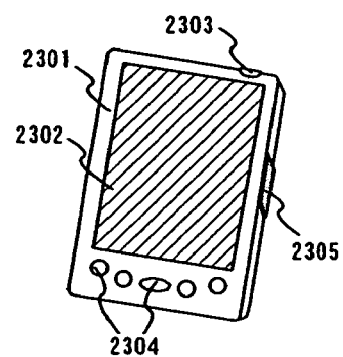

FIG. 13D shows a mobile computer, which comprises a main body 2301, a display portion 2302, a switch 2303, operation keys 2304, an infrared ray port 2305, etc. The present invention is applied to the display portion 2302.

Figure 13E:
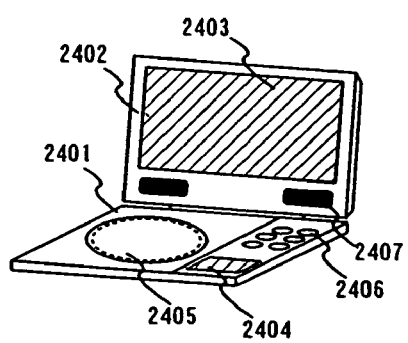

FIG. 13E shows a portable image reproducing apparatus equipped with a recording medium (a DVD player, to be specific). The apparatus comprises a main body 2401, a casing 2402, a display portion A 2403, a display portion B 2404, a recording medium (such as DVD) reading unit 2405, operation keys 2406, speaker units 2407, etc. The display portion A 2403 mainly displays image information whereas the display portion B 2404 mainly displays text information. The present invention is applied to the display portions A 2403 and B 2404. As used herein, the term "image reproducing apparatus equipped with a recording medium" includes domestic game machines.

Figure 13F:
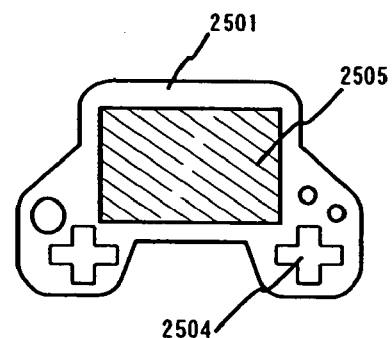

FIG. 13F shows a game machine, which comprises a main body 2501, display portion 2502, and operation switches 2504.

Figure 13G:
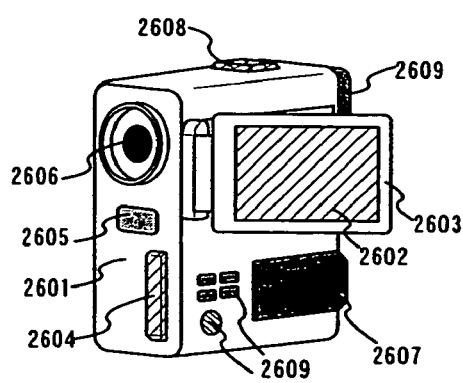

FIG. 13G shows a video camera, which comprises a main body 2601, a display portion 2602, a casing 2603, an external connection port 2604, a remote control receiving unit 2605, an image receiving unit 2606, a battery 2607, an audio input unit 2608, operation keys 2609 etc. The present invention is applied to the display portion 2602.

Figure 13H:
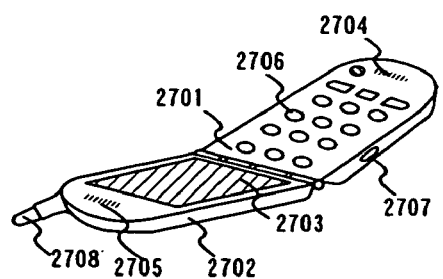

FIG. 13H shows a cellular phone, which comprises a main body 2701, a casing 2702, a display portion 2703, an audio input unit 2704, an audio output unit 2705, operation keys 2706, an external connection port 2707, an antenna 2708, etc. The present invention is applied to the display portion 2703. If the display portion 2703 displays white characters on a black background, power consumption of the cellular phone can be reduced.

As described above, the display device obtained by implementing the present invention may be used as the display portions of any electronic equipment. The electronic equipment of the present Embodiment may use any structure of the display device shown in Embodiment Modes 1, 2, or any one of Embodiments 1 to 5.

According to the invention, a high reliable liquid crystal display device, which uses liquid crystal materials efficiently, and which has flexibility, becomes possible to be mass-produced.

What is claimed is:

1. A method for manufacturing a liquid crystal display device comprising the steps of:
    forming a first inorganic insulating film over a first substrate by radio frequency sputtering;
    forming a second inorganic insulating film over a second substrate by radio frequency sputtering;
    forming a pixel electrode over the first substrate;
    forming an opposing electrode over the second substrate;
    forming a columnar spacer over the first substrate for spacing evenly between the first substrate and the second substrate;
    drawing and pre-fixating a sealant over the second substrate;
    dropping a liquid crystal material on a region surrounded by the sealant over the second substrate;
    pasting the first substrate and the second substrate together under reduced pressure; and
    fixating the sealant by UV light passed through the second substrate,
    wherein each of the first and second inorganic insulating films comprises a silicon nitride film containing argon, and
    wherein each of the first and second inorganic insulating films is a silicon nitride film containing argon at a concentration of from $1 \times 10^{20}$ to $1 \times 10^{21}$ cm$^{-3}$.

2. A method for manufacturing a liquid crystal display device comprising the steps of:
    forming a first inorganic insulating film over a first substrate by radio frequency sputtering;
    forming a second inorganic insulating film over a second substrate by radio frequency sputtering;
    forming a pixel electrode over the first substrate;
    forming an opposing electrode over the second substrate;
    forming a columnar spacer over the first substrate for spacing evenly between the first substrate and the second substrate;
    drawing and pre-fixating a sealant over the first substrate;
    dropping a liquid crystal material on a region surrounded by the sealant over the first substrate;
    pasting the first substrate and the second substrate together under reduced pressure; and
    fixating the sealant by UV light passed through the second substrate,
    wherein each of the first and second inorganic insulating films comprises a silicon nitride film containing argon, and
    wherein each of the first and second inorganic insulating films is a silicon nitride film containing argon at a concentration of from $1 \times 10^{20}$ to $1 \times 10^{21}$ cm$^{-3}$.

3. A method for manufacturing a liquid crystal display device according to claim 1, wherein at least one of the first substrate and the second substrate is a plastic substrate.

4. A method for manufacturing a liquid crystal display device according to claim 2, wherein at least one of the first substrate and the second substrate is a plastic substrate.

5. A method for manufacturing a liquid crystal display device according to claim 1, wherein the columnar spacer is formed by an organic resin material containing at least one material as a main component selected from the group consisting of acrylic, polyimide, polyimideamide, and epoxy; by any one material of silicon oxide, silicon nitride, or silicon oxynitride; or by an inorganic material composed of a laminated film of these materials.

6. A method for manufacturing a liquid crystal display device according to claim 2, wherein the columnar spacer is formed by an organic resin material containing at least one material as a main component selected from the group consisting of acrylic, polyimide, polyimideamide, and epoxy; by any one material of silicon oxide, silicon nitride, or silicon oxynitride; or by an inorganic material composed of a laminated film of these materials.

7. A method for manufacturing a liquid crystal display device according to claim 1, wherein each of the first and second inorganic insulating films is a silicon nitride film formed by radio frequency sputtering using a silicon target.

8. A method for manufacturing a liquid crystal display device according to claim 2, wherein each of the first and second inorganic insulating films is a silicon nitride film formed by radio frequency sputtering using a silicon target.

9. A method for manufacturing a liquid crystal display device according to claim 1, wherein each of the first and second inorganic insulating films is a silicon nitride film formed by sputtering a single crystal silicon target in an N$_2$ gas or an N$_2$ and rare gas mixture under a condition that backpressure is set at most $1 \times 10^{-3}$ Pa by a turbo molecular pump or a cryopump.

10. A method for manufacturing a liquid crystal display device according to claim 2, wherein each of the first and second inorganic insulating films is a silicon nitride film formed by sputtering a single crystal silicon target in an N$_2$ gas or an N$_2$ and rare gas mixture under a condition that backpressure is set at most $1 \times 10^{-3}$ Pa by a turbo molecular pump or a cryopump.

11. A method for manufacturing a liquid crystal display device comprising the steps of:
    forming an inorganic insulating film over a first substrate by radio frequency sputtering;
    forming a thin film transistor and a pixel electrode electrically connected with the thin film transistor over the inorganic insulating film;
    forming an opposing electrode over a second substrate;
    forming a first orientation film over the opposing electrode;
    forming a columnar spacer over the inorganic insulating film for spacing evenly between the first substrate and the second substrate;
    forming a second orientation film over the columnar spacer and the pixel electrode;
    drawing and pre-fixating a sealant over the first substrate;
    dropping a liquid crystal material on a region surrounded by the sealant over the first substrate;

pasting the first substrate and the second substrate together under reduced pressure;

fixating the sealant by UV light passed through the second substrate, wherein the inorganic insulating film comprises a silicon nitride film containing argon, wherein the first orientation film is in contact with the second orientation film, and wherein the inorganic insulating film is a silicon nitride film containing argon at a concentration of from $1\times10^{20}$ to $1\times10^{21}$ cm$^{-3}$.

12. A method for manufacturing a liquid crystal display device comprising the steps of:

forming an inorganic insulating film over a first substrate by radio frequency sputtering;

forming a thin film transistor and a pixel electrode electrically connected with the thin film transistor over the inorganic insulating film;

forming an opposing electrode over a second substrate;

forming a first orientation film over the opposing electrode;

forming a columnar spacer over the inorganic insulating film for spacing evenly between the first substrate and the second substrate;

forming a second orientation film over the columnar spacer and the pixel electrode;

drawing and pre-fixating a sealant over the second substrate;

dropping a liquid crystal material on a region surrounded by the sealant over the second substrate;

pasting the first substrate and the second substrate together under reduced pressure; and fixating the sealant by UV light passed through the second substrate, wherein the inorganic insulating film comprises a silicon nitride film containing argon, wherein the first orientation film is in contact with the second orientation film, and wherein the inorganic insulating film is a silicon nitride film containing argon at a concentration of from $1\times10^{20}$ to $1\times10^{21}$ cm$^{-3}$.

13. A method for manufacturing a liquid crystal display device according to claim 11, wherein the first substrate and the second substrate is a plastic substrate.

14. A method for manufacturing a liquid crystal display device according to claim 12, wherein at least one of the first substrate and the second substrate is a plastic substrate.

15. A method for manufacturing a liquid crystal display device according to claim 11, wherein the columnar spacer is formed by an organic resin material containing at least one material as a main component selected from the group consisting of acrylic, polyimide, polyimideamide, and epoxy; by any one material of silicon oxide, silicon nitride, or silicon oxynitride; or by an inorganic material composed of a laminated film of these materials.

16. A method for manufacturing a liquid crystal display device according to claim 12, wherein the columnar spacer is formed by an organic resin material containing at least one material as a main component selected from the group consisting of acrylic, polyimide, polyimideamide, and epoxy; by any one material of silicon oxide, silicon nitride, or silicon oxynitride; or by an inorganic material composed of a laminated film of these materials.

17. A method for manufacturing a liquid crystal display device according to claim 11, wherein the inorganic insulating film is a silicon nitride film formed by radio frequency sputtering using a silicon target.

18. A method for manufacturing a liquid crystal display device according to claim 12, wherein the inorganic insulating film is a silicon nitride film formed by radio frequency sputtering using a silicon target.

19. A method for manufacturing a liquid crystal display device according to claim 11, wherein the inorganic insulating film is a silicon nitride film formed by sputtering a single crystal silicon target in an $N_2$ gas or an $N_2$ and rare gas mixture under a condition that backpressure is set at most $1\times10^{-3}$ Pa by a turbo molecular pump or a cryopump.

20. A method for manufacturing a liquid crystal display device according to claim 12, wherein the inorganic insulating film is a silicon nitride film formed by sputtering a single crystal silicon target in an $N_2$ gas or an $N_2$ and rare gas mixture under a condition that backpressure is set at most $1\times10^{-3}$ Pa by a turbo molecular pump or a cryopump.

21. A method for manufacturing a liquid crystal display device according to claim 1, further comprising the steps of:

heating and deaerating the liquid crystal material under reduced pressure.

22. A method for manufacturing a liquid crystal display device according to claim 2, further comprising the steps of:

heating and deaerating the liquid crystal material under reduced pressure.

23. A method for manufacturing a liquid crystal display device according to claim 11, further comprising the steps of:

heating and deaerating the liquid crystal material under reduced pressure.

24. A method for manufacturing a liquid crystal display device according to claim 12, further comprising the steps of:

heating and deaerating the liquid crystal material under reduced pressure.

25. A method for manufacturing a liquid crystal display device according to claim 1, wherein each of the first substrate and the second substrate is a plastic substrate.

26. A method for manufacturing a liquid crystal display device according to claim 2, wherein each of the first substrate and the second substrate is a plastic substrate.

* * * * *